United States Patent
Raghavan et al.

(10) Patent No.: US 11,864,129 B2
(45) Date of Patent: Jan. 2, 2024

(54) POWER ADJUSTMENT REQUESTS FOR DOWNLINK SIGNALING BASED ON RECEIVED POWER OVERLOADING

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 17/544,287

(22) Filed: Dec. 7, 2021

(65) Prior Publication Data
US 2023/0180144 A1 Jun. 8, 2023

(51) Int. Cl.
*H04W 52/54* (2009.01)
*H04W 52/24* (2009.01)
*H04W 52/36* (2009.01)
*H04W 52/14* (2009.01)

(52) U.S. Cl.
CPC ....... *H04W 52/245* (2013.01); *H04W 52/143* (2013.01); *H04W 52/367* (2013.01); *H04W 52/54* (2013.01)

(58) Field of Classification Search
CPC ............. H04W 52/245; H04W 52/143; H04W 52/367; H04W 52/54
See application file for complete search history.

(56) References Cited

U.S. PATENT DOCUMENTS

| | | | | |
|---|---|---|---|---|
| 7,978,845 | B2* | 7/2011 | Caveney | H04L 43/0811 |
| | | | | 379/387.01 |
| 8,442,525 | B2* | 5/2013 | Luo | H04W 72/541 |
| | | | | 455/434 |
| 9,131,524 | B2* | 9/2015 | Gaal | H04L 5/1469 |
| 9,215,686 | B2* | 12/2015 | Kazmi | H04B 17/27 |
| 10,813,137 | B2* | 10/2020 | Shih | H04W 72/23 |
| 10,820,237 | B2* | 10/2020 | Xu | H04B 17/345 |
| 10,966,207 | B1* | 3/2021 | Raghunathan | H04W 72/0473 |

(Continued)

FOREIGN PATENT DOCUMENTS

WO WO-2013191604 A1 12/2013
WO WO-2022098205 A1 * 5/2022

OTHER PUBLICATIONS

International Search Report and Written Opinion—PCT/US2022/049591—ISA/EPO—dated Mar. 24, 2023.

*Primary Examiner* — Hai V Nguyen
(74) *Attorney, Agent, or Firm* — Holland & Hart LLP/Qualcomm Incorporated

(57) ABSTRACT

Methods, systems, and devices for wireless communications are described. Generally, a user equipment (UE) may transmit an indication to a base station that a total received power for the UE exceeds an overload threshold. In some cases, the indication may be an explicit request for a decrease in transmit power by a specific amount of reduction. The UE may transmit indications that the overload threshold is exceeded to multiple transmit/receive points. The indications may request specific transmit power reduction amounts that are specific to the TRPs, or may be generic indications that the overload threshold is exceeded, and the TRPs may coordinate to reduce their respective transmit powers to satisfy the overload threshold at the UE. The base station may allocate a first set of resources for near field UEs and a second set of resources for far field UEs.

30 Claims, 18 Drawing Sheets

(56) References Cited

U.S. PATENT DOCUMENTS

| | | | |
|---|---|---|---|
| 2006/0140115 A1* | 6/2006 | Timus | H04L 47/10 370/252 |
| 2008/0214140 A1* | 9/2008 | Caveney | H04L 12/66 455/402 |
| 2009/0247166 A1* | 10/2009 | Luo | H04W 72/02 455/436 |
| 2010/0106828 A1* | 4/2010 | Palanki | H04L 5/0035 709/224 |
| 2011/0255611 A1* | 10/2011 | Caveney | H04Q 1/03 375/257 |
| 2013/0242927 A1* | 9/2013 | Luo | H04W 72/541 370/329 |
| 2014/0226500 A1* | 8/2014 | Zhou | H04W 24/10 370/252 |
| 2014/0226501 A1* | 8/2014 | Zhou | H04W 24/10 370/252 |
| 2015/0011236 A1* | 1/2015 | Kazmi | H04W 52/365 455/456.1 |
| 2019/0014514 A1* | 1/2019 | Sundberg | H04W 36/08 |
| 2019/0274169 A1* | 9/2019 | Tsai | H04W 56/0045 |
| 2020/0104823 A1* | 4/2020 | Chan | G06Q 20/223 |
| 2020/0107227 A1* | 4/2020 | Xu | H04J 11/0056 |
| 2020/0107387 A1* | 4/2020 | Li | H04B 17/318 |
| 2021/0282143 A1* | 9/2021 | Lee | H04W 52/281 |
| 2021/0314917 A1* | 10/2021 | Lee | H04W 72/02 |
| 2021/0409096 A1* | 12/2021 | Liou | H04W 56/001 |
| 2022/0240326 A1* | 7/2022 | Rune | H04W 74/0866 |
| 2022/0279523 A1* | 9/2022 | He | H04L 1/1887 |
| 2023/0077735 A1* | 3/2023 | Ji | H04W 72/21 370/329 |

* cited by examiner

POWER ADJUSTMENT REQUESTS FOR DOWNLINK SIGNALING BASED ON RECEIVED POWER OVERLOADING

FIELD OF TECHNOLOGY

The following relates to wireless communications, including power adjustment requests for downlink signaling based on received power overloading.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support power adjustment requests for downlink signaling based on received power overloading. Generally, when a user equipment (UE) detects that a total received power for signaling received by the UE exceeds an overload threshold (e.g., due to having entered the near field of a transmitting node or for one or more other reasons), the UE may transmit an explicit indication to the base station associated with the total received power for the UE exceeding the overload threshold. In some cases, such an explicit indication may be an explicit request for a decrease in transmit power by a specific amount of reduction. Additionally or alternatively, in some cases, such as explicit request may be an explicit indication that the total received power exceeds the overload threshold. Where a specific amount of reduction is indicated, the specific amount of reduction may be based on parameters such as minimum safe operational levels (e.g., as specified by regulations), a voltage or power level at a low noise amplifier (LNA), how far a total received power is from the minimum safe operational levels, how sensitive the UE is to increases in received power, or the like.

In some cases, the UE may transmit indications that the overload threshold is exceeded to multiple transmit receive points (TRPs). The indications may request specific transmit power reduction amounts that are specific to the TRPs, or may be generic indications that the overload threshold is exceeded, and the TRPs may coordinate to reduce their respective transmit powers to satisfy the overload threshold at the UE (e.g., in a multi-TRP (mTRP) scenario). In some examples, the base station may allocate a first set of resources for near field UEs and a second set of resources for far field UEs. The base station may communicate with near field UEs on the first set of resources at a reduced transmit power, and may communicate with far field UEs on the second set of resources at a normal (e.g., non-reduced) transmit power.

A method for wireless communications at a UE is described. The method may include receiving, from a first wireless node, first downlink signaling associated with a first received power, identifying, based on receiving the first downlink signaling, that a total received power at the UE exceeds an overload threshold, transmitting, to the first wireless node based on the identifying, an explicit indication associated with the total received power at the UE exceeding the overload threshold, and receiving, from the first wireless node and based on transmitting the explicit indication, second downlink signaling associated with a second received power less than the first received power.

An apparatus for wireless communications is described. The apparatus may include memory, a transceiver, and at least one processor of a user equipment, the at least one processor coupled with the memory and the transceiver. The at least one processor may be configured to cause the apparatus to receive, from a first wireless node, first downlink signaling associated with a first received power, identify, based on receiving the first downlink signaling, that a total received power at the UE exceeds an overload threshold, transmit, to the first wireless node based on the identifying, an explicit indication associated with the total received power at the UE exceeding the overload threshold, and receive, from the first wireless node and based on transmitting the explicit indication, second downlink signaling associated with a second received power less than the first received power.

Another apparatus for wireless communications at a UE is described. The apparatus may include means for receiving, from a first wireless node, first downlink signaling associated with a first received power, means for identifying, based on receiving the first downlink signaling, that a total received power at the UE exceeds an overload threshold, means for transmitting, to the first wireless node based on the identifying, an explicit indication associated with the total received power at the UE exceeding the overload threshold, and means for receiving, from the first wireless node and based on transmitting the explicit indication, second downlink signaling associated with a second received power less than the first received power.

A non-transitory computer-readable medium storing code for wireless communications at a UE is described. The code may include instructions executable by a processor to receive, from a first wireless node, first downlink signaling associated with a first received power, identify, based on receiving the first downlink signaling, that a total received power at the UE exceeds an overload threshold, transmit, to the first wireless node based on the identifying, an explicit indication associated with the total received power at the UE exceeding the overload threshold, and receive, from the first wireless node and based on transmitting the explicit indication, second downlink signaling associated with a second received power less than the first received power.

In some examples of the method, apparatuses, and non-transitory computer-readable medium described herein, transmitting the explicit indication associated with the total received power at the UE exceeding the overload threshold may include operations, features, means, or instructions for transmitting an explicit request for the first wireless node to reduce a transmit power for the first wireless node by an indicated amount of reduction, where a difference between the first received power and the second received power may be based on the indicated amount of reduction.

Some examples of the method, apparatuses, and non-transitory computer-readable medium described herein may further include operations, features, means, or instructions for determining the indicated amount of reduction based on the total received power, the overload threshold, an amount of noise for an amplifier of the UE, whether a sensitivity of an antenna at the UE satisfies a threshold, or any combination thereof.

In some examples of the method, apparatuses, and non-transitory computer-readable medium described herein, operations, features, means, or instructions for receiving the first downlink signaling may include operations, features, means, or instructions for receiving the first downlink signaling on a first set of frequency resources, and operations, features, means, or instructions for transmitting the explicit indication associated with the total received power at the UE exceeding the overload threshold may include operations, features, means, or instructions for transmitting the explicit indication via the first set of frequency resources.

In some examples of the method, apparatuses, and non-transitory computer-readable medium described herein, operations, features, means, or instructions for receiving the first downlink signaling may include operations, features, means, or instructions for receiving the first downlink signaling on a first set of frequency resources, and operations, features, means, or instructions for transmitting the explicit indication associated with the total received power at the UE exceeding the overload threshold may include operations, features, means, or instructions for transmitting the explicit indication via a second set of frequency resources that is different from the first set of frequency resources.

Some examples of the method, apparatuses, and non-transitory computer-readable medium described herein may further include operations, features, means, or instructions for transmitting, to a second wireless node based on the identifying, a second explicit indication associated with the total received power at the UE exceeding the overload threshold.

In some examples of the method, apparatuses, and non-transitory computer-readable medium described herein, transmitting the explicit indication and the second explicit indication may include operations, features, means, or instructions for transmitting, to the first wireless node, a first request that the first wireless node reduce a first transmit power for the first wireless node by a first indicated amount of reduction and transmitting, to the second wireless node, a second request that the second wireless node reduce a second transmit power for the second wireless node by a second indicated amount of reduction.

Some examples of the method, apparatuses, and non-transitory computer-readable medium described herein may further include operations, features, means, or instructions for determining the first indicated amount of reduction based on a distance between the UE and the first wireless node, a received signal strength from the first wireless node, or both, where transmitting the first request may be based on the determining the first indicated amount of reduction and determining the second indicated amount of reduction based on a distance between the UE and the second wireless node, a received signal strength from the second wireless node, or both, where transmitting the second request may be based on the determining the second indicated amount of reduction.

Some examples of the method, apparatuses, and non-transitory computer-readable medium described herein may further include operations, features, means, or instructions for receiving, from the first wireless node based on transmitting the explicit indication associated with the total received power at the UE exceeding the overload threshold, an indication of a subset of resources for receiving the second downlink signaling associated with the second received power and monitoring the subset of resources for the second downlink signaling based on receiving the indication of the subset of resources, where receiving the second downlink signaling associated with the second received power may be based on the monitoring.

In some examples of the method, apparatuses, and non-transitory computer-readable medium described herein, receiving the second downlink signaling may include operations, features, means, or instructions for receiving the second downlink signaling according to a second modulation and coding scheme associated with the second received power, where the second modulation and coding scheme may be different from a first modulation and coding scheme associated with the first downlink signaling.

In some examples of the method, apparatuses, and non-transitory computer-readable medium described herein, the first wireless node includes a base station, a transmission reception point, or a second UE.

In some examples of the method, apparatuses, and non-transitory computer-readable medium described herein, the overload threshold may be configured to prevent saturation of an AGC component of a transceiver of the UE, or an LNA of the UE, or both.

In some examples of the method, apparatuses, and non-transitory computer-readable medium described herein, identifying that the total received power at the UE exceeds the overload threshold may include identifying that the UE has entered a near field for the first wireless node.

A method for wireless communications at a first wireless node is described. The method may include transmitting, to a UE, first downlink signaling associated with a first transmit power, receiving, from the UE, an explicit indication associated with a total received power at the UE exceeding an overload threshold, where the total received power at the UE is based on the first downlink signaling associated with the first transmit power, and transmitting, to the UE, second downlink signaling associated with a second transmit power less than the first transmit power, where the second transmit power is based on the explicit indication associated with the total received power at the UE exceeding the overload threshold.

An apparatus for wireless communications is described. The apparatus may include memory, a transceiver, and at least one processor of a first wireless node, the at least one processor coupled with the memory and the transceiver. The at least one processor may be configured to cause the apparatus to transmit, to a UE, first downlink signaling associated with a first transmit power, receive, from the UE, an explicit indication associated with a total received power at the UE exceeding an overload threshold, where the total received power at the UE is based on the first downlink signaling associated with the first transmit power, and transmit, to the UE, second downlink signaling associated with a second transmit power less than the first transmit power, where the second transmit power is based on the explicit indication associated with the total received power at the UE exceeding the overload threshold.

Another apparatus for wireless communications at a first wireless node is described. The apparatus may include means for transmitting, to a UE, first downlink signaling associated with a first transmit power, means for receiving, from the UE, an explicit indication associated with a total received power at the UE exceeding an overload threshold, where the total received power at the UE is based on the first downlink signaling associated with the first transmit power, and means for transmitting, to the UE, second downlink signaling associated with a second transmit power less than the first transmit power, where the second transmit power is based on the explicit indication associated with the total received power at the UE exceeding the overload threshold.

A non-transitory computer-readable medium storing code for wireless communications at a first wireless node is described. The code may include instructions executable by a processor to transmit, to a UE, first downlink signaling associated with a first transmit power, receive, from the UE, an explicit indication associated with a total received power at the UE exceeding an overload threshold, where the total received power at the UE is based on the first downlink signaling associated with the first transmit power, and transmit, to the UE, second downlink signaling associated with a second transmit power less than the first transmit power, where the second transmit power is based on the explicit indication associated with the total received power at the UE exceeds the overload threshold.

In some examples of the method, apparatuses, and non-transitory computer-readable medium described herein, receiving the explicit indication associated with the total received power at the UE exceeding the overload threshold may include operations, features, means, or instructions for receiving an explicit request to reduce a transmit power for downlink signaling to the UE by an indicated amount of reduction equal to a difference between the first transmit power and the second transmit power.

In some examples of the method, apparatuses, and non-transitory computer-readable medium described herein, receiving the explicit indication associated with the total received power at the UE exceeding the overload threshold may include operations, features, means, or instructions for receiving the indication via a first set of frequency resources, where the first downlink signaling may be transmitted via the first set of frequency resources.

In some examples of the method, apparatuses, and non-transitory computer-readable medium described herein, receiving the explicit indication associated with the total received power at the UE exceeding the overload threshold may include operations, features, means, or instructions for receiving the indication via a first set of frequency resources, where the first downlink signaling may be transmitted via a second set of frequency resources that may be different from the first set of frequency resources.

Some examples of the method, apparatuses, and non-transitory computer-readable medium described herein may further include operations, features, means, or instructions for exchanging signaling with a second wireless node based on receiving the explicit indication associated with the total received power at the UE exceeding the overload threshold, where the total received power at the UE may be based on downlink signaling by the second wireless node, and where the second transmit power may be based on exchanging the signaling with the second wireless node.

In some examples of the method, apparatuses, and non-transitory computer-readable medium described herein, exchanging the signaling with the second wireless node may include operations, features, means, or instructions for transmitting to the second wireless node or receiving from the second wireless node an explicit indication of an amount of transmit power reduction for the first wireless node, an amount of transmit power reduction for the second wireless node, or both.

Some examples of the method, apparatuses, and non-transitory computer-readable medium described herein may further include operations, features, means, or instructions for transmitting, to the UE based on receiving the explicit indication associated with the total received power at the UE exceeding the overload threshold, an indication of a first subset of resources for the second downlink signaling associated with the second transmit power, where the second downlink signaling may be transmitted via the first subset of resources.

Some examples of the method, apparatuses, and non-transitory computer-readable medium described herein may further include operations, features, means, or instructions for transmitting, to a second UE, an indication of a second subset of resources for third downlink signaling associated with a third transmit power that may be greater than the second transmit power, where the third transmit power being associated with the third downlink signaling to the second UE may be based on the second UE being farther from the first wireless node than the UE and transmitting, to the second UE, the third downlink signaling associated with the third transmit power via the second subset of resources.

Some examples of the method, apparatuses, and non-transitory computer-readable medium described herein may further include operations, features, means, or instructions for determining that a location of the UE satisfies a threshold distance from the first wireless node, determining that a location of the second UE fails to satisfy the threshold distance from the first wireless node, and determining that the second UE may be farther from the first wireless node than the UE based on determining that the location of the UE satisfies the threshold distance from the first wireless node and determining that the location of the second UE fails to satisfy the threshold distance from the first wireless node.

In some examples of the method, apparatuses, and non-transitory computer-readable medium described herein, transmitting the second downlink signaling may include operations, features, means, or instructions for transmitting the second downlink signaling according to a second modulation and coding scheme associated with the second transmit power, where the second modulation and coding scheme may be different from a first modulation and coding scheme associated with the first downlink signaling.

In some examples of the method, apparatuses, and non-transitory computer-readable medium described herein, the first wireless node includes a base station, a transmission reception point, or a third UE.

DETAILED DESCRIPTION

Figure 1:
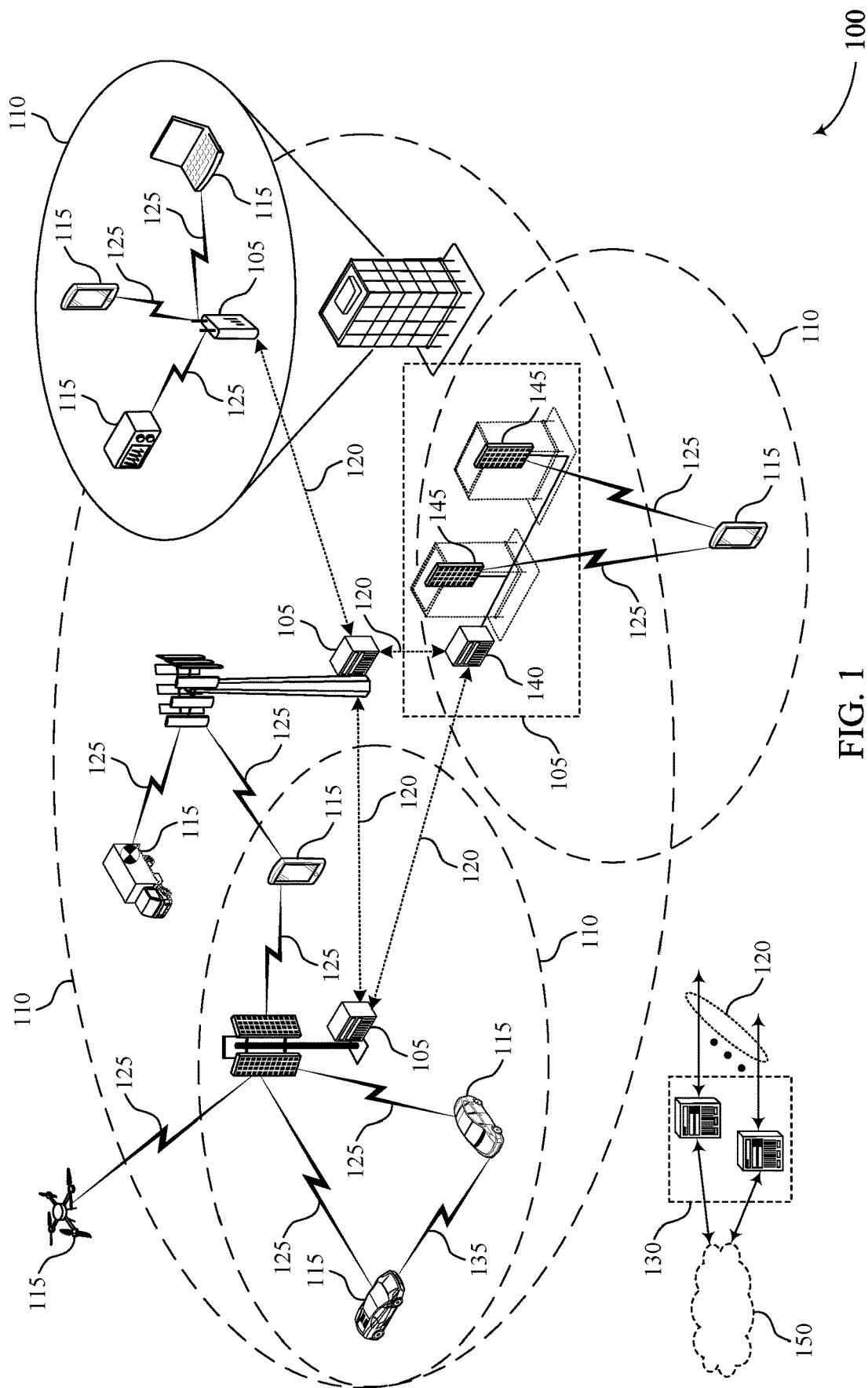
FIG. 1 illustrates an example of a wireless communications system that supports power adjustment requests for downlink signaling based on received power overloading in accordance with aspects of the present disclosure.

In some wireless communications systems, one or more wireless devices (e.g., user equipments (UEs) may communicate with other wireless devices (e.g., base stations, transmit receive points (TRPs), or the like). Within a coverage area of a base station, some UEs may be located at a far field distance (e.g., outside of a threshold distance from the base station), or closer to the base station, at a near field distance (e.g., within a threshold distance from the base station). A region nearer to the transmitting node than the far field distance may be referred to as the near field, and a region farther from the transmitting node than the far field distance may be referred to as the far field. A far field distance for a transmitting node may depend on a wavelength used for communications as well as a size or aperture (e.g., largest dimension of) an antenna array used for communications. As communications frequencies increase (and wavelengths decrease) and array sizes increase, the far field distance for a transmitting node may increase. Thus, as communications systems continue to evolve, far field distances for base stations or other transmitting nodes may increase, and hence the likelihood of a UE entering the near field of a base station or other transmitting node may also increase. Increased densification of networks at higher carrier frequencies may also lead to an increased likelihood of a UE (e.g., or any receiving node) being in the near field of a transmitting node.

When a UE is in the near field, path loss from the base station may be significantly decreased. This may result in the UE operating at a level of received power that exceeds an overload threshold (e.g., is not safe for UE operation, at which the UE is not capable of reliable operation, at which one or more components of the UE are saturated, or any combination thereof). For example, if the level of received power at the UE exceeds the overload threshold, the automatic gain control (AGC) functionality at a UE may fail (e.g., the UE may not be capable of performing successful automatic gain control, such as due to a corresponding AGC component being saturated and thus operating outside of a linear range of operation, due to an LNA being saturated and thus operating outside of a linear range of operation, or any combination thereof). In some cases, the UE may be capable of mitigating excessive received power up to some maximum value (e.g., by some maximum number of decibels (dB)), but may not be able to successfully receive and decode downlink signaling if the received power is too high (e.g., due to saturation of receiver circuitry, such as an AGC component or one or more amplifiers such as LNAs at the UE). Conventional systems lack mechanisms by which a UE may explicitly indicate a received power overload condition or explicitly request that a base station or other transmitting node decrease a transmit power (e.g., when the UE is located in a near field of the base station or transmitting node).

When a UE detects that a total received power for signaling received by the UE exceeds an overload threshold (e.g., due to having entered the near field of a transmitting node or for one or more other reasons), the UE may transmit an explicit indication to the base station associated with the total received power for the UE exceeding the overload threshold (e.g., an explicit indication related to received power at the UE). In some cases, such an explicit indication may be an explicit request for a decrease in transmit power by a specific amount of reduction. Additionally or alternatively, in some cases, such an explicit request may be an explicit indication that the total received power exceeds the overload threshold. Where a specific amount of reduction in transmit power is indicated, the specific amount of reduction may be based on parameters such as minimum safe operational levels (e.g., as specified by regulations), thresholds beyond which an AGC component or LNA signal become saturated (e.g., are no longer operating in a linear range of operation), how far a total received power is from the minimum safe operational levels, sensitivity levels for one or more antennas of the UE, or the like. In some cases, the total received power for signaling received by the UE exceeding the overload threshold may indicate a near-field condition for the UE, which may mean that the UE is sufficiently close to a transmitting node that the UE is receiving a near-field signal as opposed to a far-field signal.

In some cases, the UE may transmit indications that the overload threshold is exceeded to multiple TRPs. The indications may request specific transmit power reduction amounts that are specific to the TRPs, or may be generic indications that the overload threshold is exceeded, and the TRPs may coordinate to reduce their respective transmit powers to satisfy the overload threshold at the UE (e.g., in a multi-TRP (mTRP) scenario).

In some examples, the base station may allocate a first set of resources for near field UEs and a second set of resources for far field UEs. The base station may communicate with near field UEs on the first set of resources at a reduced transmit power, and may communicate with far field UEs on the second set of resources at a normal (e.g., non-reduced) transmit power.

Aspects of the disclosure are initially described in the context of wireless communications systems. Aspects of the disclosure are further illustrated by and described with reference to wireless communications systems and process flows. Aspects of the disclosure are further illustrated by and described with reference to apparatus diagrams, system diagrams, and flowcharts that relate to power adjustment requests for downlink signaling based on received power overloading.

FIG. 1 illustrates an example of a wireless communications system 100 that supports power adjustment requests for downlink signaling based on received power overloading in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

When a UE 115 detects that a total received power for signaling received by the UE 115 exceeds an overload threshold (e.g., due to having entered the near field of a transmitting node or for one or more other reasons), the UE 115 may transmit an indication to the base station that the total received power for the UE 115 exceeds the overload threshold. In some cases, the indication may be an explicit request for a decrease in transmit power by a specific amount of reduction, where the specific amount of reduction may be based on parameters such as minimum safe operational levels, thresholds beyond which an AGC component or LNA signal become saturated (e.g., are no longer operating in a linear range of operation), how far a total received power is from the minimum safe operational levels, sensitivity levels for one or more antennas of the UE, or the like. The UE 115 may transmit indications that the overload threshold is exceeded to multiple TRPs. The indications may request specific transmit power reduction amounts that are specific to the TRPs, or may be generic indications that the overload threshold is exceeded, and the TRPs may coordinate to reduce their respective transmit powers to satisfy the overload threshold at the UE 115 (e.g., in a multi-TRP (mTRP) scenario). In some examples, the base station may allocate a first set of resources for near field UEs 115 and a second set of resources for far field UEs 115. The base station may communicate with near field UEs 115 on the first set of resources at a reduced transmit power, and may communicate with far field UEs on the second set of resources at a normal (e.g., non-reduced) transmit power.

Figure 2:
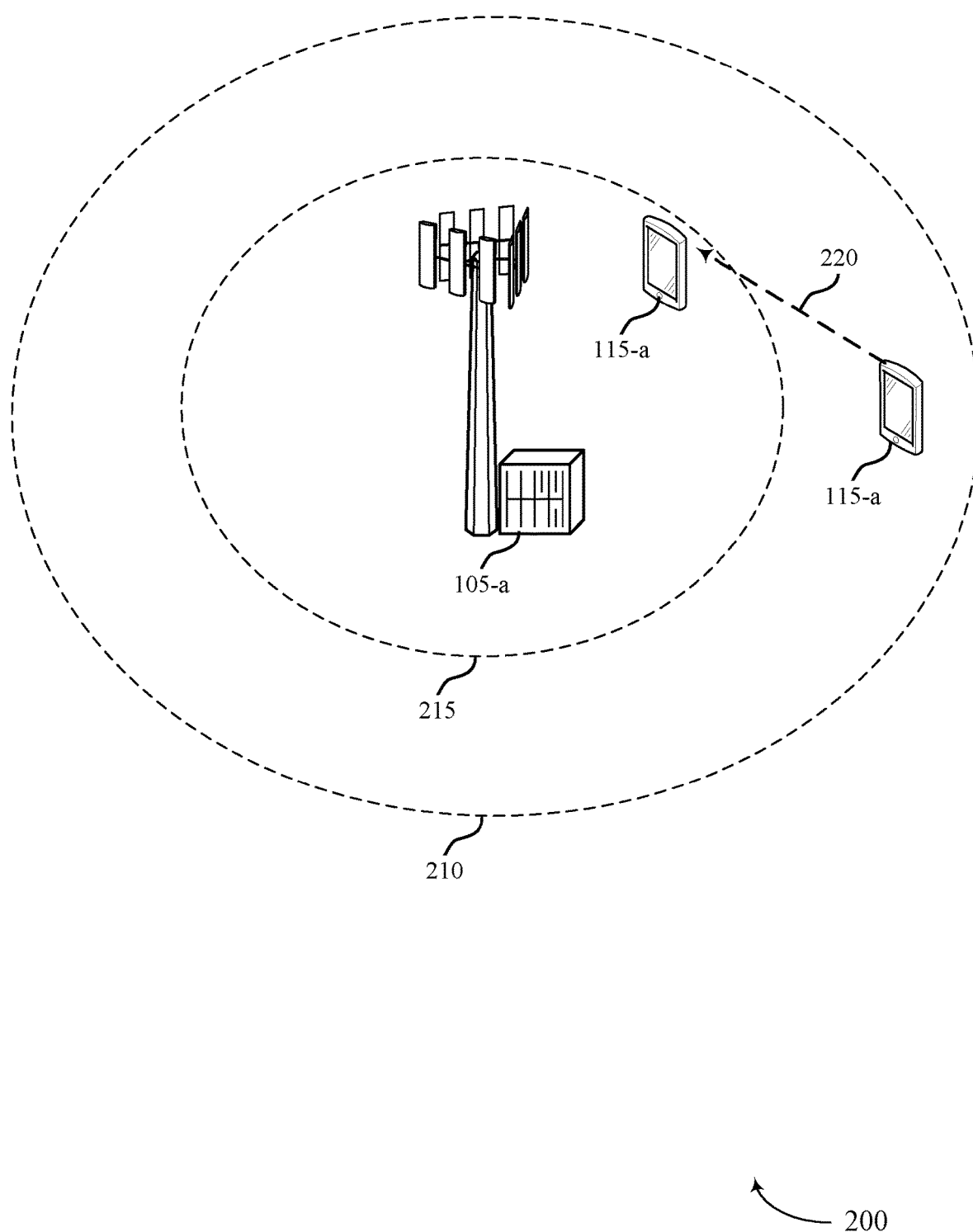
FIG. 2 illustrates an example of a wireless communications system that supports power adjustment requests for downlink signaling based on received power overloading in accordance with aspects of the present disclosure.

FIG. 2 illustrates an example of a wireless communications system 200 that supports power adjustment requests for downlink signaling based on received power overloading in accordance with aspects of the present disclosure. Wireless communications system 200 may include a transmitting node (e.g., a base station 105-*a*), and a UE 115-*a*. Although described and illustrated with reference to a base station 105-*a* and a UE 115-*a*, techniques described herein may be applied by any wireless device, and any transmitting node (e.g., a TRP, a base station 105-*a*, an IAB node, another UE transmitting sidelink signaling, or the like). In some examples, the transmitting node could be one of a UE, a CPE, a relay node, a repeater node, an IAB node, or an intelligent reflective surface (IRS)-type node, or the like.

Base station 105-*a* may serve one or more UEs 115 (e.g., the UE 115-*a*) located within a coverage area. UEs 115 that are located within the coverage area, but are outside of a threshold distance from the base station 105-*a* (e.g., a far field distance), may be located within a far field 210. UEs 115 located within the coverage area and within the threshold distance (e.g., the far field distance) may be located within a near field 215. UEs located within near field 215 may be referred to as near field UEs 115. UEs 115 located outside of the near field 215 but within the far field 210 may be referred to as far field UEs 115.

Far fields and near fields may depend on a wavelength used for communications as well as a size (e.g., largest dimension of) an antenna array used for communications. UEs 115 and base stations 105 may perform multi-antenna beamforming in some deployments (e.g., in some frequency bands, such as frequency band 2 (FR2), in millimeter wave systems, or the like). The UE 115-*a* may generate a beam 205 (e.g., by performing multi-antenna beamforming) A far field distance (e.g., the threshold distance from the base station 105-*a* tat defines the boundaries of near field 215) may be defined as a Fraunhofer distance, such as $2D^2/\lambda$ where D represents a largest dimension of an array (D=Nd where d represents an inter-antenna element spacing for a linear array of size N), and where $\lambda$ represents a wavelength of a transmission. Thus, far field distance may increase quadratically in array size and may increase linearly in frequency. For large arrays and higher carrier frequencies, the far field distance (e.g., the threshold distance from the base station 105-*a*) thus may be meaningfully large, making it more likely that a UE 115 may enter the near field 215 for a base station 105 or other transmitting node. For instance, a far field distance may be 20.48 meters and with a 64 by 1 antenna array with a wavelength of 30 GHz, but may be 41.6 meters with a 64 by 1 antenna array with a wavelength of 60 GHz.

In some examples, a UE 115-*a* located in the far field of the base station 105-*a* may move in direction 220, and hence from a far field 210 into near field 215. When a UE is in the near field 215, path loss from the base station 105-*a* may be significantly decreased. According, when the UE 115-*a* enters the near field 215, the total received power at the UE 115-*a* may increase such that some communication parameters, or assumptions, that function within the far field 210, may fail. For example, upon entering the near field 215, the UE 115-*a* may experience an overload condition, in which a total received power level at the UE 115-*a* exceeds an overload threshold. When the total received power level at the UE 115-*a* exceeds the overload threshold, the UE 115-*a* may not be capable of safe operation, operation that satisfies one or more reliability thresholds, or any combination thereof. Thus, in some cases, the total received power for signaling received by the UE 115-*a* exceeding the overload threshold may indicate a near-field condition for the UE 115-*a*, which may mean that the UE 115-*a* is sufficiently close to a base station 105-*a* or other transmitting node that the UE 115-*a* is receiving a near-field signal as opposed to a far-field signal.

For example, the UE 115-*a* may include a transceiver. The transceiver may include an LNA, an AGC component, or both. In some examples, the overload threshold may be associated with a saturation threshold for the LNA, with a saturation threshold for the AGC, or both. As used herein, a saturation threshold for a component may refer to a signal level (e.g., voltage level, power level) below which the component operates in a linear range of operation an beyond which the component operations in a non-linear (e.g. saturation) range of operation. Thus, the saturation threshold for an LNA and the saturation threshold for an AGC component at the UE 115-*a* may be different, though they may also be related (e.g., because the AGC component may adjust the gain of the LNA, possibly among other components, as part of implementing an AGC algorithm at the UE 115-*a*). In some examples, an overload threshold as described herein may be configured to so as to maintain an LNA, an AGC, or both at a UE 115-*a* operating within a corresponding linear range of operation.

In some cases, if total received power level at the UE 115-*a* is such that the AGC component becomes saturated, the AGC component may fail (e.g., the UE may not be capable of performing successful automatic gain control) or may have degraded performance when the total received power level is later reduced beyond the overload threshold (e.g., the AGC component may have degraded performance when returning to a linear range of operation). For example, an AGC component for the UE 115-*a* may support a range of received power variation, but may not be able to support over-saturation within the near field 215. For instance, the UE 115-*a* may be capable of mitigating excessive received power up to some threshold value (e.g., by a threshold number of dB), but may not be able to successfully receive and decode downlink signaling if the received power is too high. A net effect of such excessive received power at the UE 115-*a* may be that if a transmit power level (e.g., at one or more transmitting devices, such as the base station 105-*a*) continues to exceed safe operational levels, the UE 115-*a* may not be able to continue downlink operations.

Although uplink power control operations may affect uplink transmit power by the UE, if the UE cannot trigger reliable downlink power control by the transmitting node (e.g., the base station 105-*a*), then a UE 115-*a* located in near field 215 may not have a mechanism by which to mitigate or avoid over-saturation and unsafe received power levels. For example, if the UE 115-*a* is located in the near field 215, path loss between the base station 105-*a* and the UE 115-*a* may not be sufficiently large to reduce signal strength received at the UE 115-*a*. The UE 115-*a* may benefit from indicating, to the base station 105-*a*, that an overload threshold has been satisfied. Implicit signaling of received power levels may not be reliable. For instance, a UE 115-*a* may transmit a channel quality report (e.g., a channel state information reference signal (CSI-RS) feedback report) in which the UE 115-*a* may report a channel is good (e.g., satisfies a threshold quality level). In response to CSI reporting, the base station 105-*a* may determine whether to reduce or otherwise adjust a transmit power to satisfy link requirements. However, the base station 105-*a* may not be constrained to reduce a transmit power in response to implicit indications of channel quality (e.g., CSI reporting), and the UE 115-*a* may therefore not be able to rely on an assumption that implicit indications of channel quality or received power will be sufficient to mitigate LNA or AGC saturation, unsafe received power levels, or the like. That is, the UE 115-a may not be able to rely on an assumption that the base station 105-a will reduce a transmit power based on such implicit reporting. Instead, as described herein, a UE 115-a may transmit an explicit feedback message to a transmitting node (e.g., the base station 105-a) to address over-saturation (e.g., received power that exceeds an overload threshold). In response to such explicit feedback signaling, the base station 105-a may reduce a transmit power accordingly. That is, the base station may respond to the feedback message by reducing a transmit power resulting in a reduced received power at the UE 115-a that is within safe operational levels. Such techniques are described herein.

In some examples, the UE 115-a may transmit a request, to the base station 105-a, that the base station 105-a reduce a transmit power in downlink operations. The request may include an indication that the base station 105-a reduce a transmit power by a specific amount of reduction (e.g., a number of dBs). The UE 115-a may determine the amount of reduction of the transmit power reduction based on one or more factors, parameters, or other considerations. For instance, the UE 115-a may determine the amount of reduction of the transmit power reduction based on a signal strength of downlink signaling received at the UE 115-a, how far the received signal strength is from safe operational levels (e.g., the UE 115-a may determine a difference between received signal strength and a threshold or standard level of safe operations at the UE 115-a), how sensitive the UE 115-a is to LNA saturation, a size of a range of acceptable power levels for performing AGC at the UE 115-a, an amount of noise or signal strengths detected by an amplifier, such as a low-noise amplifier (LNA), or the like. The UE 115-a may transmit the request to the base station 105-a on the same frequency resources (e.g., a same band, a same bandwidth part (BWP), a same component carrier, a same channel, or the like) on which downlink signaling is received. In some examples, the UE 115-a may transmit the request to the base station 1025-a on different frequency resources (e.g., a different band, a different BWP, a different component carrier, a different channel, or the like) from the frequency resources on which the downlink signaling is received.

The transmitting node (e.g., the base station 105-a, or any other transmitting node, such as a TRP, a UE 115 operating in sidelink mode, or the like) may, upon receiving the explicit request from the UE 115-a, reduce a transmit power by the amount of reduction indicated by the UE 115-a. The transmitting node may similarly change a modulation and coding scheme (MCS) associated with the downlink signaling. The base station 105-a may then transmit downlink signaling to the UE 115-a using the adjusted MCS and adjusted transmit power.

The UE 115-a may transmit an indication that overload threshold is satisfied. The indication that overload threshold is satisfied may include an explicit request to reduce a transmit power at the base station 105-a by an amount of reduction. In some examples, the indication that overload threshold is satisfied may simply indicate that a transmit power from the base station 105-a is too high or exceeds a transmit power, that a total received power at the UE 115-a is too high and exceeds overload threshold, or a flag or bit indicating that overload threshold is satisfied. In some examples, as described in greater detail with reference to FIG. 3, the UE 115-a may transmit an indication that overload threshold is satisfied to multiple TRPs, and the multiple TRPs may adjust their respective transmit powers accordingly. In some examples, as described in greater detail with reference to FIG. 4, the base station 105-a may allocate different resources for near field UEs 115 and far field UEs 115, and may communicate using different transmit powers on the different resources (e.g., with a reduced transmit power on resources allocated to near field UE, and at a higher or non-reduced transmit power on resources allocated to far field UEs).

Figure 3:
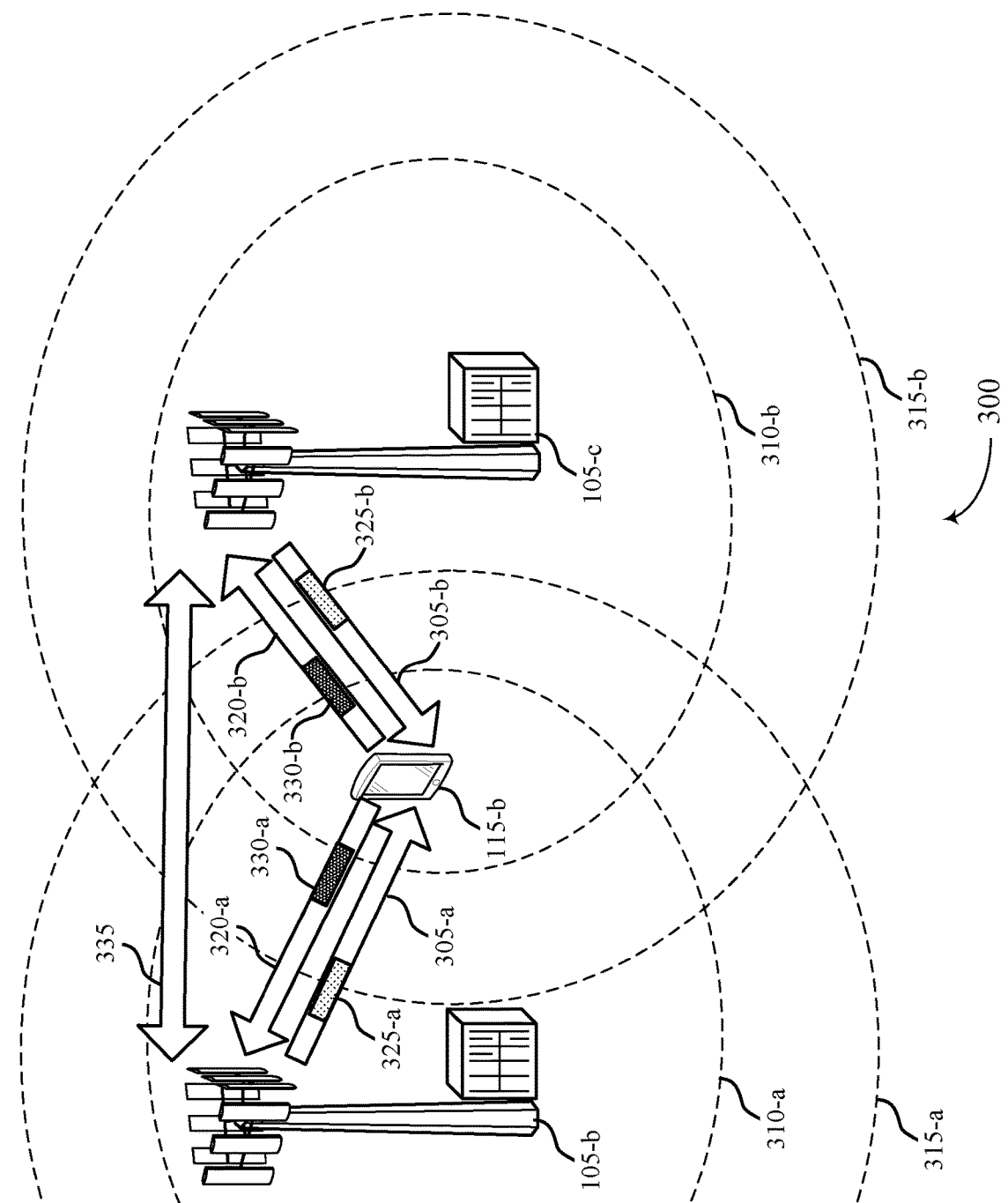
FIG. 3 illustrates an example of a wireless communications system that supports power adjustment requests for downlink signaling based on received power overloading in accordance with aspects of the present disclosure.

FIG. 3 illustrates an example of a wireless communications system 300 that supports power adjustment requests for downlink signaling based on received power overloading in accordance with aspects of the present disclosure. Wireless communications system 300 may include one or more transmitting nodes, such as base station 105-b and base station 105-c, and one or more receiving nodes, such as the UE 115-b. Although illustrated with respect to base stations 105, the transmitting nodes may be any transmitting device, including, but not limited to, TRPs (e.g., in an mTRP deployment), UEs 115 (e.g., operating in sidelink mode), or the like. In some examples, the transmitting node could be one of a UE, a CPE, a relay node, a repeater node, an IAB node, or an IRS-type node, or the like. Each transmitting node may serve one or more UEs 115. In some examples (e.g., in an mTRP deployment), multiple transmitting nodes (e.g., the base station 105-b and the base station 105-c) may serve a UE 115-b. The base station 105-b may serve UEs 115 located within a far field 315-a, a near field 310-a, or both, as described in greater detail with reference to FIG. 2. The base station 105-c may also serve UEs 115 located within far field 315-b, near field 310-b, or both. UEs 115 located within a far field 315 may be referred to as far field UEs 115, and UEs 115 located within a near field 310 may be referred to as near field UEs 115.

The base station 105-b may communicate with the UE 115-b via downlink 305-a and uplink 320-a, while the base station 105-c may communicate with the UE 115-b via downlink 305-b and uplink 320-b. In some examples, the base station 105-b and the base station 105-c may communicate with each other via communication link 335. Communication link 335 may be a backhaul link (e.g., via an X2, Xn, or other interface), may be a wired connection, or may be a wireless connection. The base stations 105 may communicate with each other directly (e.g., directly between base stations 105), or indirectly (e.g., via a core network), or both.

In some examples, as described in greater detail with reference to FIG. 2, the UE 115-a may enter a near field 310 (e.g., near field 310-a for the base station 105-b, near field 310-b for the base station 105-c, or both as illustrated with reference to FIG. 3), and may experience a received power that exceeds an overload threshold. For instance, the base station 105-b may transmit downlink signaling 325-a to the UE 115-b at a first transmit power, the base station 105-c may transmit downlink signaling 325-b to the UE 115-b at a second transmit power (e.g., that may be the same as or different from the first transmit power). The first transmit power, the second transmit power, both, or a combination of the first transmit power and the second transmit power, may result in a received power at the UE 115-b that exceeds an overload threshold.

The UE 115-a may request that different transmitting nodes (e.g., the base station 105-b and the base station 105-c) reduce their transmit power. The UE 115-b may transmit, to the base station 105-b and to the base station 105-c, an indication that overload threshold has been exceeded. For instance, the UE 115-b may transmit request message 330-a to the base station 105-b and may transmit request message 330-b to the base station 105-c. Each request message 330 may include a request to reduce a transmit power at the respective base station 105. In some examples, the request messages 330 may include a specific amount of reduction by which the UE 115-*a* requests that the base station 105 reduce a transmit power. The amount of reduction may be the same for multiple transmitting nodes, or may be specific to the transmitting node. For instance, the UE 115-*b* may request that the base station 105-*b* reduce its transmit power by a first level (e.g., a first number of dBs) and may request that the base station 105-*c* reduce its transmit power by a second level (e.g., a second number of dBs that is different from the first number of dBs). The UE 115-*b* may transmit both the request message 330-*a* and the request message 330-*b*. In some examples, the UE 115-*b* may transmit a single request message 330 (e.g., the request message 330-*a* to the base station 105-*b*), and the receiving transmitting node (e.g., the base station 105-*b*) may relay the message (e.g., via communication link 335) to one or more neighbor or other transmitting nodes (e.g., the base station 105-*c*).

In some examples, the UE 115-*b* may determine how much to request that each base station 105 reduces a transmit power based on how close the UE 115-*b* is to each base station 105, a signal strength received from single TRP transmissions, or a combination thereof. For instance, if the UE 115-*b* is located closer to the base station 105-*b* than it is to the base station 105-*c*, then the UE 115-*b* may request that the base station 105-*b* reduce its transmit power by a first amount of reduction and may request that the base station 105-*c* reduce its transmit power by a second amount of reduction that is smaller than the first amount of reduction.

In some examples, the UE 115-*b* may indicate (e.g., in one or more request messages 330) that power levels received by the UE 115-*b* exceed a threshold for safe operation (e.g., the overload threshold condition), such as a threshold specified by regulations or otherwise. In such examples, the request messages 330 may not include a specific amount of reduction by which the transmitting nodes are requested to reduce their respective transmit powers. Instead, the base station 105-*b* and the base station 105-*c* may determine, via signaling amongst themselves via the communication link 335), how to meet a safe margin operation (e.g., satisfy overload threshold) at the UE 115-*b*. In some examples, the safe margin operation levels, overload threshold, or both, may be indicated in the request message 330, included in one or more standards, determined by the base stations 105, the UE 115-*b*, or both, or any combination thereof. The base stations 105 may determine respective amount of reductions by which to reduce their respective transmit powers based on how close the UE 115-*b* is to each base station 105, a signal strength received from single TRP transmissions (e.g., indicated by the UE 115-*b* via the request message 330, a reporting message, or the like), or a combination thereof.

Upon receiving the request messages 330, coordinating with each other via the communication link 335, or a combination thereof, the base stations 105 may reduce their respective transmit powers (e.g., by amount of reductions indicated in the request messages 330, as coordinated with each other, etc.). The base stations 105 may also adjust their MCSs according to the reduced transmit powers. The base stations 105 may then transmit downlink signaling 325 according to the updated transmit powers and MCSs.

In some examples, as described in greater detail with reference to FIG. 4, base stations 105 may allocate resources to near field UEs 115 and far field UEs 115.

Figure 4:
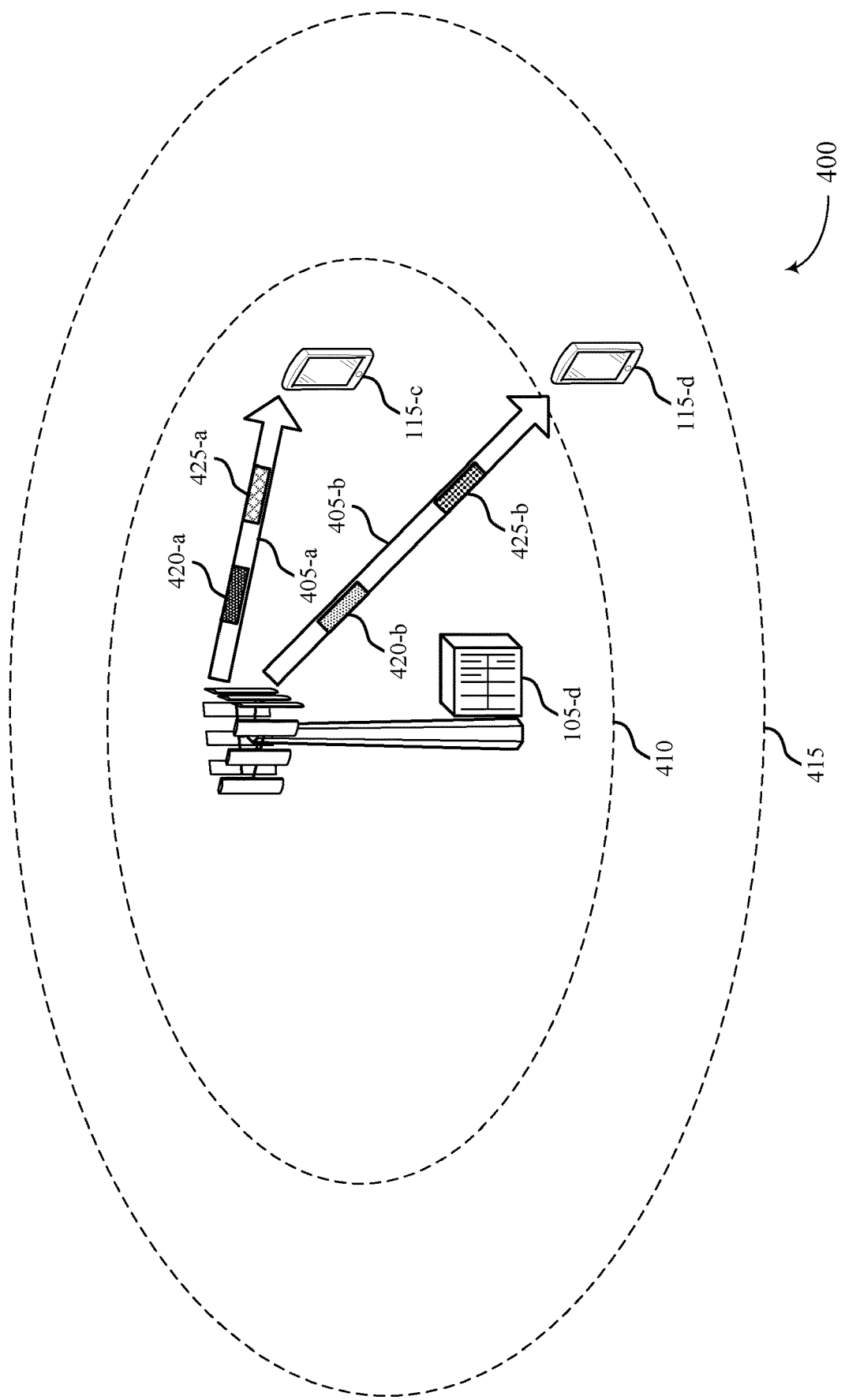
FIG. 4 illustrates an example of a wireless communications system that supports power adjustment requests for downlink signaling based on received power overloading in accordance with aspects of the present disclosure.

FIG. 4 illustrates an example of a wireless communications system 400 that supports power adjustment requests for downlink signaling based on received power overloading in accordance with aspects of the present disclosure. Wireless communications system 400 may include one or more transmitting nodes, such as base station 105-*d*, and one or more receiving nodes, such as the UE 115-*c* and the UE 115-*d*. Although illustrated with respect to base stations 105, the transmitting nodes may be any transmitting device, including, but not limited to, TRPs (e.g., in an mTRP deployment), UEs 115 (e.g., operating in sidelink mode), or the like. In some examples, the transmitting node could be one of a UE, a CPE, a relay node, a repeater node, an IAB node, or an IRS-type node, or the like. Each transmitting node may serve one or more UEs 115. The base station 105-*d* may serve UEs 115 located within a far field 415, a near field 410, or both, as described in greater detail with reference to FIG. 2. The base station 105-*d* may communicate with the UE 115-*c* via downlink 405-*a*, and the base station 105-*d* may communicate with the UE 115-*d* via downlink 405-*b*.

In some examples, the base station 105-*d* may serve multiple UEs 115 (e.g., in a time division multiplexing (TDM) configuration, a frequency domain multiplexing (FDM) configuration, a spatial domain multiplexing (SDM) configuration, or any combination thereof). In such examples, the base station 105-*d* may ameliorate an impact on AGCs at the various UEs 115 by providing the signaling described herein. For example, the base station 105-*d* may indicate exclusive resources where it expects UEs 115 to receiving downlink signaling for AGC operation (e.g., far field UEs 115), and resources where transmit power is constrained to not saturate a receiving UE 115 (e.g., near field UEs 115). UEs 115 may use a subset of resources (e.g., in time) as indicated by the base station 105-*d* to receive downlink signaling. A UE 115 may identify special types of slots, symbols, beams, or any combination thereof, that are intended for a specific type of UE (e.g., a near field UE 115 or a far field UE 115), and the receiving UE 115 may then ignore received signal strength indicator (RSSI) from other slots, symbols, or beams, for AGC operations.

For example, the base station 105-*d* may transmit, the UE 115-*c*, a resource allocation message 420-*a*. The resource allocation message 420-*a* may be a dynamic grant, indicating a set of resources, or may be higher layer signaling configuring patterns, sets, or subsets of resources (e.g., time resources, frequency resources, special resources, or any combination thereof), or the like, for receiving downlink signaling 425-*a*.

The resources allocated by the resource allocation message 420-*a* may be specific to near field UEs 115 (e.g., UE 115-*c*). For example, the base station 105-*d* may transmit downlink signaling 425-*a* at a reduced transmit power using the resource allocated for near field UEs 115. By contrast, the base station 105-*d* may transmit downlink signaling 425-*b* to the UE 115-*d* using resources specific to far field UEs 115, and may not transmit downlink signaling 425-*b* at a reduced transmit power. The reduction of transmit power for downlink signaling 425-*a* on near field resources may be fixed, included in one or more standards, based on an indication from the UE 115-*c* in an uplink message, or requested by the UE 115-*c* as described in greater detail with reference to FIGS. 2 and 3.

The resource allocation message 420-*a* may be specific to the UE 115-*c*, and may allocate a subset of a set of resources specific to near field UEs. In some examples, the resource allocation message 420-*a* may indicate a full set of resources, and may include an indication of a subset of the resources allocated for near field UE 115-c, and a subset of the resources allocated for far field UE 115-d, and the UE 115-c may select the appropriate subset of resources based on its location (e.g., within near field 410). In some examples, the base station 105-d may identify the location of the UE 115-c within the near field 410 (e.g., via positioning procedures, global positioning system (GPS) information, 5G-based positioning, or the like), and may transmit the resource allocation message 420-a to the UE 115-c based thereon. In some examples, the UE 115-c may transmit an indication that an overload threshold has been exceeded (e.g., as described in greater detail with reference to FIGS. 2 and 3), and the base station 105-d may transmit the resource allocation message 420-a to the UE 115-c based on receiving the indication.

Similarly, as described with reference to the resource allocation message 420-a, the base station 105-d may transmit a resource allocation message 420-b to the UE 115-d. The resource allocation message 420-b may include an indication of resources on which to receive downlink signaling 425-b. The base station 105-d may transmit downlink signaling 425-b to the UE 115-d on the resources indicated in the resource allocation message 420-b without reducing a transmit power (e.g., because the UE 115-d is a far field UE 115, and a power reduction will occur based on path loss outside of a far field distance from the base station 105-d).

By allocating resources to near field UEs 115 and far field UEs 115, and performing downlink transmissions at different transmit powers on the different sets of resources, the base station 105-d may avoid or mitigate overload conditions at near field UEs 115-c.

Figure 5:
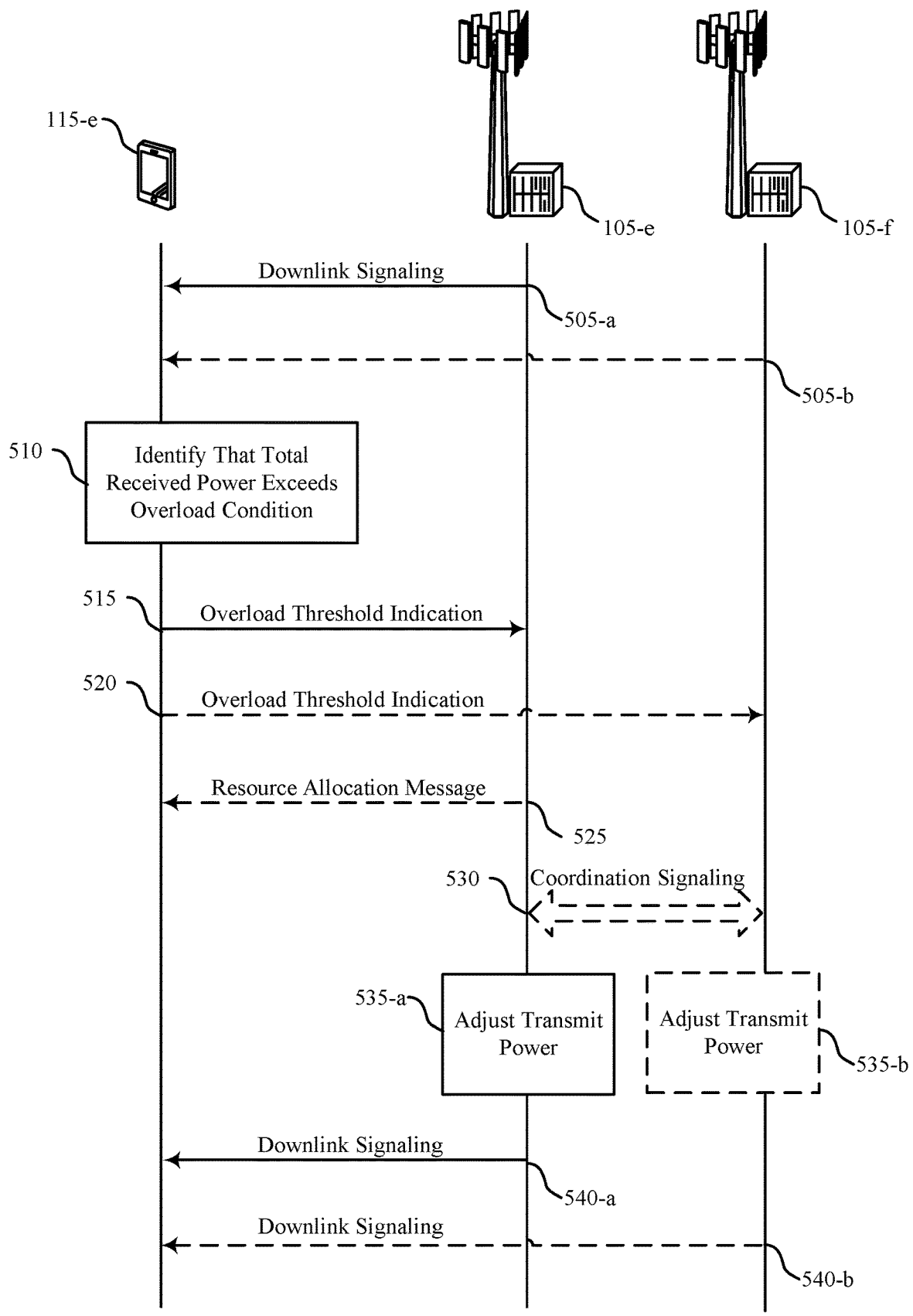
FIG. 5 illustrates an example of a process flow that supports power adjustment requests for downlink signaling based on received power overloading in accordance with aspects of the present disclosure.

FIG. 5 illustrates an example of a process flow 500 that supports power adjustment requests for downlink signaling based on received power overloading in accordance with aspects of the present disclosure. Process flow 500 may be performed in the context of wireless communications system that includes one or more transmitting nodes, such as base station 105-e and base station 105-f, and one or more receiving nodes, such as the UE 115-e. Although illustrated with respect to base stations 105, the transmitting nodes may be any transmitting device, including, but not limited to, TRPs (e.g., in an mTRP deployment), UEs 115 (e.g., operating in sidelink mode), or the like. Each transmitting node may serve one or more UEs 115. In some examples (e.g., in an mTRP deployment), multiple transmitting nodes (e.g., the base station 105-e and the base station 105-f) may serve a UE 115-e. In some examples, the UE 115-e may enter a near field of the base station 105-e, the base station 105-f, or both.

At 505-a, the base station 105-e may transmit, and the UE 115-e may receive, first downlink signaling. The base station 105-a may transmit the downlink signaling at a first transmit power, and the UE 115-e may receive the downlink signaling at a first received power.

At 510, the UE 115-e may identify that a total received power exceeds an overload condition. For example, the UE 115-e may also receive, at 505-b, downlink signaling from the base station 105-f. The downlink signaling received at 505-a, the downlink signaling received at 505-b, or both, may exceed the overload condition. Or, in some examples, a combination of the received downlink signaling may exceed the overload condition. LNAs at the UE 115-e may be saturated, or within a threshold amount of risk of becoming saturated, or the like.

At 515, the UE 115-e may transmit, to the base station 105-e, an overload threshold indication. For example, the UE 115-e may transmit an explicit indication associated with the total received power at the UE 115-e exceeding the overload threshold. The UE 115-e may transmit the indication on the same set of frequency resources on which the downlink signaling was received at 505-a, or on a different set of frequency resources from which the downlink signaling was received at 505-a.

At 535-a, the base station 105-e may adjust a transmit power based at least in part on receiving the overload threshold indication at 515. The base station 105-e may also adjust its MCS according to the adjusted transmit power. At 540-a, the base station 105-e may transmit, and the UE 115-e may receive, downlink signaling according to the adjusted transmit power (e.g., a reduced transmit power) and the updated MCS. The UE 115-e may receive the downlink signaling at 540-a at a second received power that is less than the received power at which it received the downlink signaling at 505. The total received power may not exceed the overload threshold, resulting in more successful reception of the downlink signaling, improved throughput, reduced system latency, improved reliability of wireless communications, and improved user experience.

In some examples, the UE 115-e may indicate a specific amount of power reduction to the base station 105-e. The UE 115-e may indicate an amount of received power to be reduced, an amount of transmit power that the base station 105-e is instructed to reduce, or a combination thereof. For example, at 515, the UE 115-e may transmit the overload threshold indication, which may be a request for the base station 105-e to reduce a transmit power for the base station 105-e by an indicated amount of reduction (e.g., a number of dB). In such examples, at 535-a, base station 105-e may reduce a transmit power for the base station 105-e by the indicated amount of transmit power reduction. The UE 115-e may determine the indicated amount of power reduction based at least in part on a total received power, an overload threshold, an amount of noise for an amplifier of the UE, a sensitivity of an antenna at the UE 115-e, or any combination thereof. The sensitivity of the antenna at UE 115-e may be defined on a per device level or a per antenna level, or any combination thereof. The sensitivity of the antenna may be defined as a threshold level corresponding to a smallest (e.g., lowest receive power) signal at which the antenna can maintain at least a threshold level of reliability. The sensitivity of antenna thus may be defined as a quantity in decibel units. When indicating a specific amount of power reduction to the transmitting node, for example, the UE 115-e may select the specific amount of power reduction to avoid the transmitting node (e.g., the base station 105-e) backing off its power excessively to the point that the received power of a signal at the receiving device goes below the sensitivity level of the antenna at the receiving device (e.g., the UE 115-e)—that is, the UE 115-e may select the specific amount of power reduction to not be excessively large, to avoid an excessive power reduction below the sensitivity of the antenna.

In some examples, the UE 115-a may transmit an overload threshold indication to multiple transmitting nodes. For example, at 520, the UE 115-e may also transmit an overload threshold indication to the base station 105-f. The overload threshold indication transmitted at 515 may include a first request that the base station 105-e reduce its transmit power by a first indicated amount of reduction, and the overload threshold indication transmitted at 520 may include a second request that the base station 105-f reduce its transmit power by second indicated amount of reduction. The first and second indicated amounts of reduction may be different, or may be the same. In such examples, the UE 115-e may determine the first requested amount of reduction and the second requested amount of reduction based on a distance between the UE 115-*e* and the base station 105-*e*, a distance between the UE 115-*e* and the base station 105-*f*, a received signal strength from the base station 105-*e* (e.g., at 505-*a*), a received signal strength from the base station 105-*f* (e.g., at 505-*b*), or any combination thereof. At 535-*a*, the base station 105-*e* may adjust a transmit power (e.g., may reduce a transmit power by the first requested amount of reduction) and an associated MCS. At 535-*b*, the base station 105-*f* may adjust a transmit power (e.g., may reduce a transmit power by the second requested amount of reduction) and an associated MCS. At 540-*a*, the base station 105-*e* may transmit the downlink signaling according to the reduced transmit power and adjusted MCS. At 540-*b*, the base station 105-*f* may transmit the downlink signaling according to the reduced transmit power and the adjusted MCS.

In some examples, instead of a specific request for an amount of power reduction, the UE 115-*e* may simply indicate (e.g., at 515 and 520) that overload threshold has been exceeded. In such examples, the base station 105-*e* and the base station 105-*f* may perform coordination signaling with each other at 530, as described with reference to FIG. 3, to determine by how much the base station 105-*e* and the base station 105-*f* will reduce respective transmit powers. For example, the base station 105-*e* may transmit to the base station 105-*f*, or receive from the base station 105-*f*, an indication of an amount of transmit power reduction for the base station 105-*e*, an amount of transmit power for the base station 105-*f*, or both. In some examples, the base station 105-*e* and the base station 105-*f* may communicate with each other via a backhaul link (e.g., via an X2, Xn, or other interface), a wired connection, a wireless connection, or the like. The base stations 105 may be a communicate with each other directly (e.g., directly between base stations 105), or an indirectly (e.g., via a core network), or both.

In some examples, the base stations 105-*e* may allocate resources to the UE 115-*e* based on a UE type (e.g., near field UE 115 or far field UE 115). For instance, if the UE 115-*e* has entered the near field of one of the base stations 105, the base station 105-*e* may transmit, to the UE 115-*e* at 525, a resource allocation message. The resource allocation message may include an indication of a first subset of resources for the second downlink signaling associated with the second transmit power at 540-*a*. The first subset of resources may be associated with near field UEs. In such examples, the base station 105-*e* may transmit the downlink signaling at 540-*a* using the indicated first subset of resources at a reduced transmit power (e.g., as reduced at 535-*a*). In some examples, the base station 105-*e* may autonomously transmit the resource allocation message (e.g., based on a location of the UE 115-*e* with reference to the base station 105-*e*). In some examples, the base station 105-*e* may transmit the resource allocation message to the UE 115-*e* in response to receiving the overload threshold indication at 515. In some examples, the base station 105-*e* may transmit, to another UE 115 (e.g., a far field UE), an indication of a second subset of resources for downlink signaling to the other UE 115 at a transmit power that is higher than the transmit power at which the base station 105-*e* transmits the downlink signaling at 540-*a*. That is, the base station 105-*e* may transmit downlink signaling on the first subset of resources at a lower transmit power and may transmit downlink signaling on the second subset of resources at a higher transmit power, based at least in part on the other UE 115 being farther from the base station 105-*e* than the UE 115-*e*. For instance, the base station 105-*e* may determine that the UE 115-*e* satisfies a threshold distance from the base station 105-*e* (e.g., is a near field UE 115), and may determine that the other UE 115 does not satisfy the threshold distance from the base station 105-*e* (e.g., is a far field UE 115), and may allocate the resources at 525 according to the determination.

Figure 6:
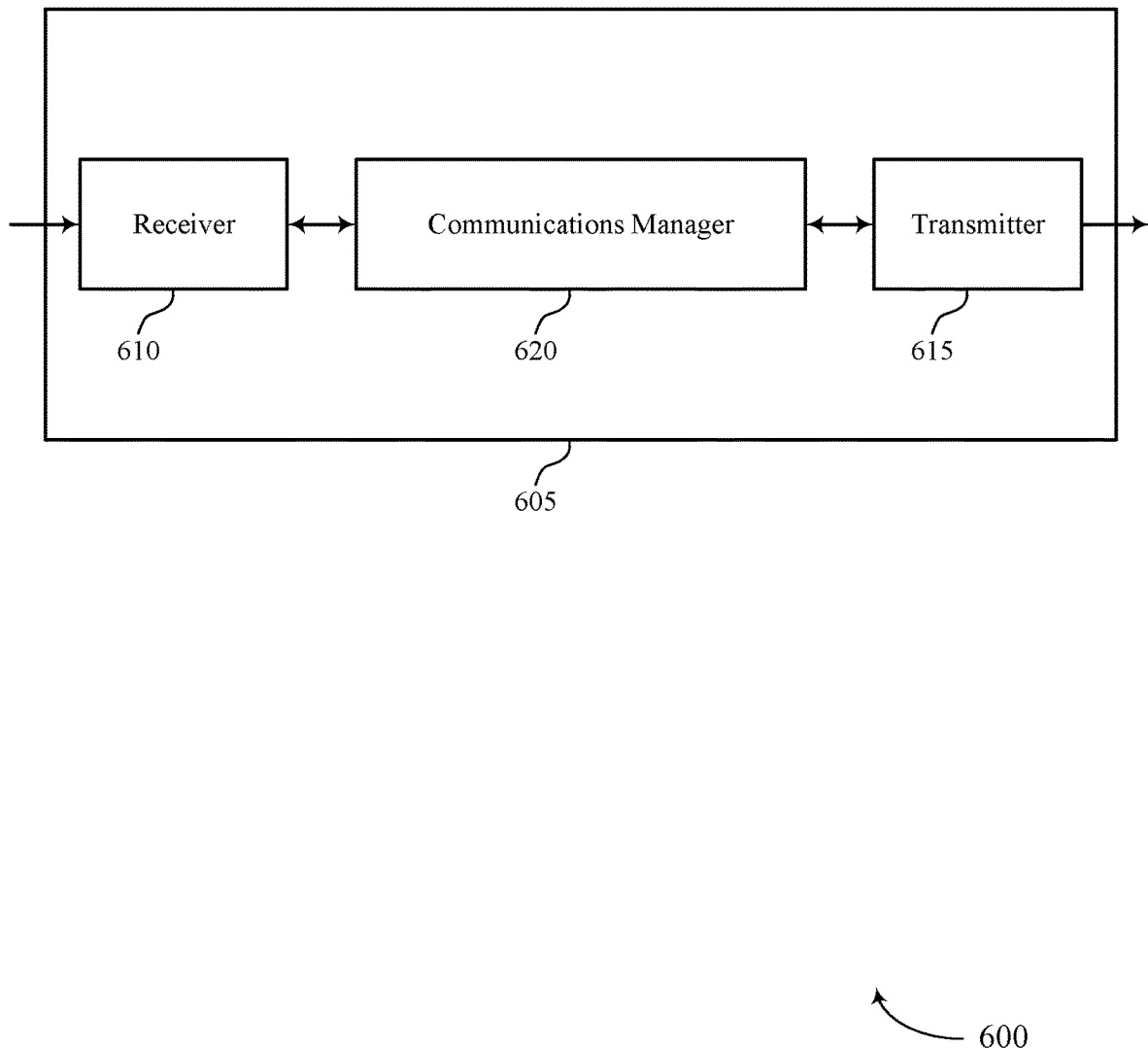
FIGS. 6 and 7 show block diagrams of devices that support power adjustment requests for downlink signaling based on received power overloading in accordance with aspects of the present disclosure.

FIG. 6 shows a block diagram 600 of a device 605 that supports power adjustment requests for downlink signaling based on received power overloading in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to power adjustment requests for downlink signaling based on received power overloading). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to power adjustment requests for downlink signaling based on received power overloading). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of power adjustment requests for downlink signaling based on received power overloading as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving, from a first wireless node, first downlink signaling associated with a first received power. The communications manager 620 may be configured as or otherwise support a means for identifying, based on receiving the first downlink signaling, that a total received power at the UE exceeds an overload threshold. The communications manager 620 may be configured as or otherwise support a means for transmitting, to the first wireless node based on the identifying, an explicit indication associated with the total received power at the UE exceeding the overload threshold. The communications manager 620 may be configured as or otherwise support a means for receiving, from the first wireless node and based on transmitting the explicit indication, second downlink signaling associated with a second received power less than the first received power.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for power adjustment requesting based on received power overloading, resulting in decreased system delays, more reliable wireless communications, increased system throughput, decreased system latency, and improved user experience.

Figure 7:
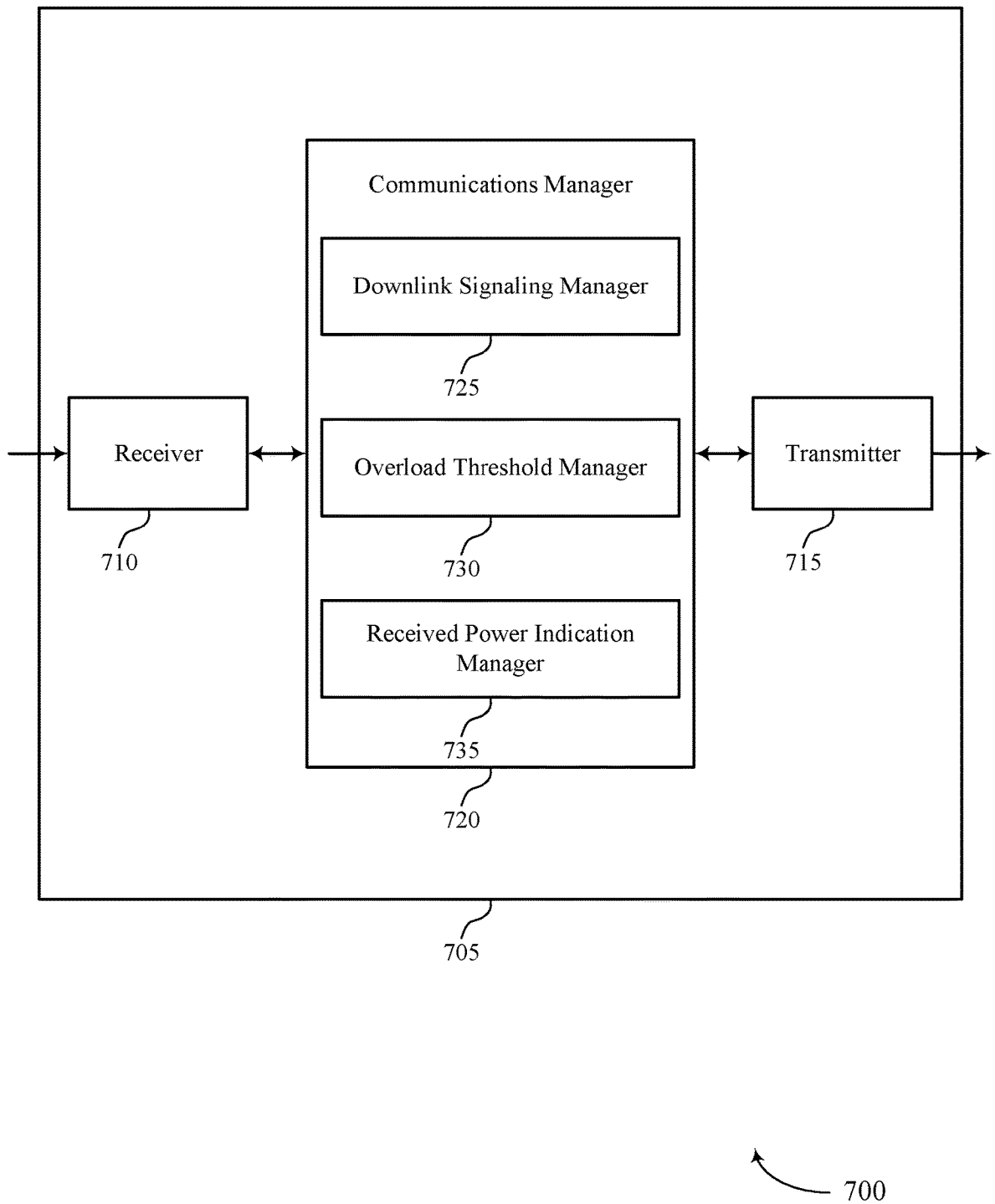

FIG. 7 shows a block diagram 700 of a device 705 that supports power adjustment requests for downlink signaling based on received power overloading in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to power adjustment requests for downlink signaling based on received power overloading). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to power adjustment requests for downlink signaling based on received power overloading). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of power adjustment requests for downlink signaling based on received power overloading as described herein. For example, the communications manager 720 may include a downlink signaling manager 725, an overload threshold manager 730, a received power indication manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The downlink signaling manager 725 may be configured as or otherwise support a means for receiving, from a first wireless node, first downlink signaling associated with a first received power. The overload threshold manager 730 may be configured as or otherwise support a means for identifying, based on receiving the first downlink signaling, that a total received power at the UE exceeds an overload threshold. The received power indication manager 735 may be configured as or otherwise support a means for transmitting, to the first wireless node based on the identifying, an explicit indication associated with the total received power at the UE exceeding the overload threshold. The downlink signaling manager 725 may be configured as or otherwise support a means for receiving, from the first wireless node and based on transmitting the explicit indication, second downlink signaling associated with a second received power less than the first received power.

Figure 8:
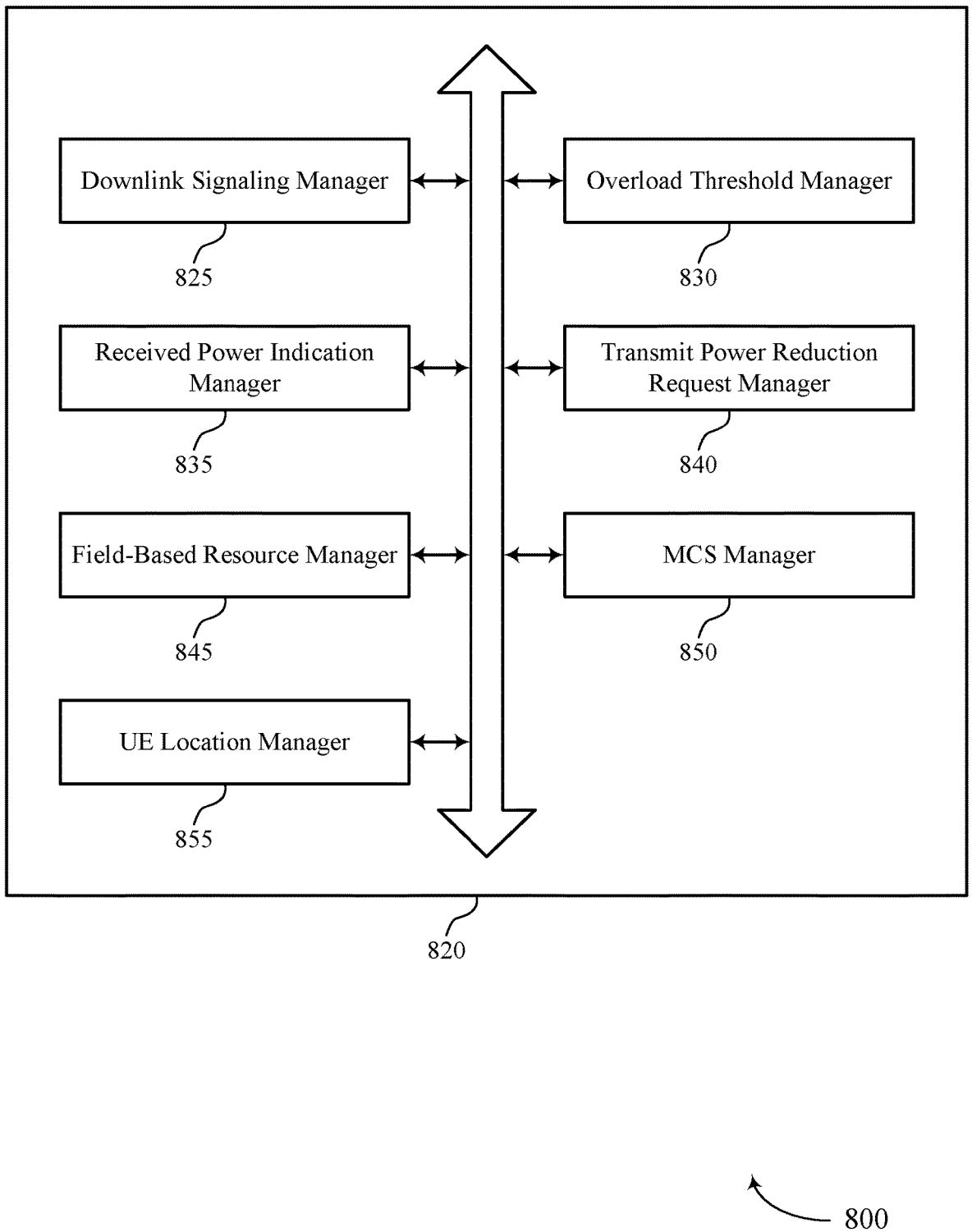
FIG. 8 shows a block diagram of a communications manager that supports power adjustment requests for downlink signaling based on received power overloading in accordance with aspects of the present disclosure.

FIG. 8 shows a block diagram 800 of a communications manager 820 that supports power adjustment requests for downlink signaling based on received power overloading in accordance with aspects of the present disclosure. The communications manager 820 may be an example of aspects of a communications manager 620, a communications manager 720, or both, as described herein. The communications manager 820, or various components thereof, may be an example of means for performing various aspects of power adjustment requests for downlink signaling based on received power overloading as described herein. For example, the communications manager 820 may include a downlink signaling manager 825, an overload threshold manager 830, a received power indication manager 835, a transmit power reduction request manager 840, a field-based resource manager 845, an MCS manager 850, a UE location manager 855, or any combination thereof. Each of these components may communicate, directly or indirectly, with one another (e.g., via one or more buses).

The communications manager 820 may support wireless communications at a UE in accordance with examples as disclosed herein. The downlink signaling manager 825 may be configured as or otherwise support a means for receiving, from a first wireless node, first downlink signaling associated with a first received power. The overload threshold manager 830 may be configured as or otherwise support a means for identifying, based on receiving the first downlink signaling, that a total received power at the UE exceeds an overload threshold. The received power indication manager 835 may be configured as or otherwise support a means for transmitting, to the first wireless node based on the identifying, an explicit indication associated with the total received power at the UE exceeding the overload threshold. In some examples, the downlink signaling manager 825 may be configured as or otherwise support a means for receiving, from the first wireless node and based on transmitting the explicit indication, second downlink signaling associated with a second received power less than the first received power.

In some examples, to support transmitting the explicit indication associated with the total received power at the UE exceeding the overload threshold, the transmit power reduction request manager 840 may be configured as or otherwise support a means for transmitting an explicit request for the first wireless node to reduce a transmit power for the first wireless node by an indicated amount of reduction, where a difference between the first received power and the second received power is based on the indicated amount of reduction.

In some examples, the transmit power reduction request manager 840 may be configured as or otherwise support a means for determining the indicated amount of reduction based on the total received power, the overload threshold, an amount of noise for an amplifier of the UE, a sensitivity of an antenna at the UE, or any combination thereof.

In some examples, receiving the first downlink signaling includes receiving the first downlink signaling on a first set of frequency resources, and transmitting the explicit indication associated with the total received power at the UE exceeding the overload threshold includes transmitting the explicit indication via the first set of frequency resources.

In some examples, receiving the first downlink signaling includes receiving the first downlink signaling on a first set of frequency resources, and transmitting the explicit indication associated with the total received power at the UE exceeding the overload threshold includes transmitting the explicit indication via a second set of frequency resources that is different from the first set of frequency resources.

In some examples, the received power indication manager 835 may be configured as or otherwise support a means for transmitting, to a second wireless node based on the identifying, a second explicit indication associated with the total received power at the UE exceeding the overload threshold.

In some examples, to support transmitting the explicit indication and the second explicit indication, the transmit power reduction request manager 840 may be configured as or otherwise support a means for transmitting, to the first wireless node, a first request that the first wireless node reduce a first transmit power for the first wireless node by a first indicated amount of reduction. In some examples, to support transmitting the indication and the second indication, the transmit power reduction request manager 840 may be configured as or otherwise support a means for transmitting, to the second wireless node, a second request that the second wireless node reduce a second transmit power for the second wireless node by a second indicated amount of reduction.

In some examples, the UE location manager 855 may be configured as or otherwise support a means for determining the first indicated amount of reduction based on a distance between the UE and the first wireless node, a received signal strength from the first wireless node, or both, where transmitting the first request is based on the determining the first indicated amount of reduction. In some examples, the UE location manager 855 may be configured as or otherwise support a means for determining the second indicated amount of reduction based on a distance between the UE and the second wireless node, a received signal strength from the second wireless node, or both, where transmitting the second request is based on the determining the second indicated amount of reduction.

In some examples, the field-based resource manager 845 may be configured as or otherwise support a means for receiving, from the first wireless node based on transmitting the explicit indication associated with the total received power at the UE exceeding the overload threshold, an indication of a subset of resources for receiving the second downlink signaling associated with the second received power. In some examples, the field-based resource manager 845 may be configured as or otherwise support a means for monitoring the subset of resources for the second downlink signaling based on receiving the indication of the subset of resources, where receiving the second downlink signaling associated with the second received power is based on the monitoring.

In some examples, to support receiving the second downlink signaling, the MCS manager 850 may be configured as or otherwise support a means for receiving the second downlink signaling according to a second modulation and coding scheme associated with the second received power, where the second modulation and coding scheme is different from a first modulation and coding scheme associated with the first downlink signaling.

In some examples, the first wireless node includes a base station, a transmission reception point, or a second UE.

In some examples, the overload threshold may be configured to prevent saturation of an AGC component of a transceiver of the UE, or an LNA of the transceiver of the UE, or both.

In some examples, identifying that the total received power at the UE exceeds the overload threshold includes identifying that the UE has entered a near field for the first wireless node.

Figure 9:
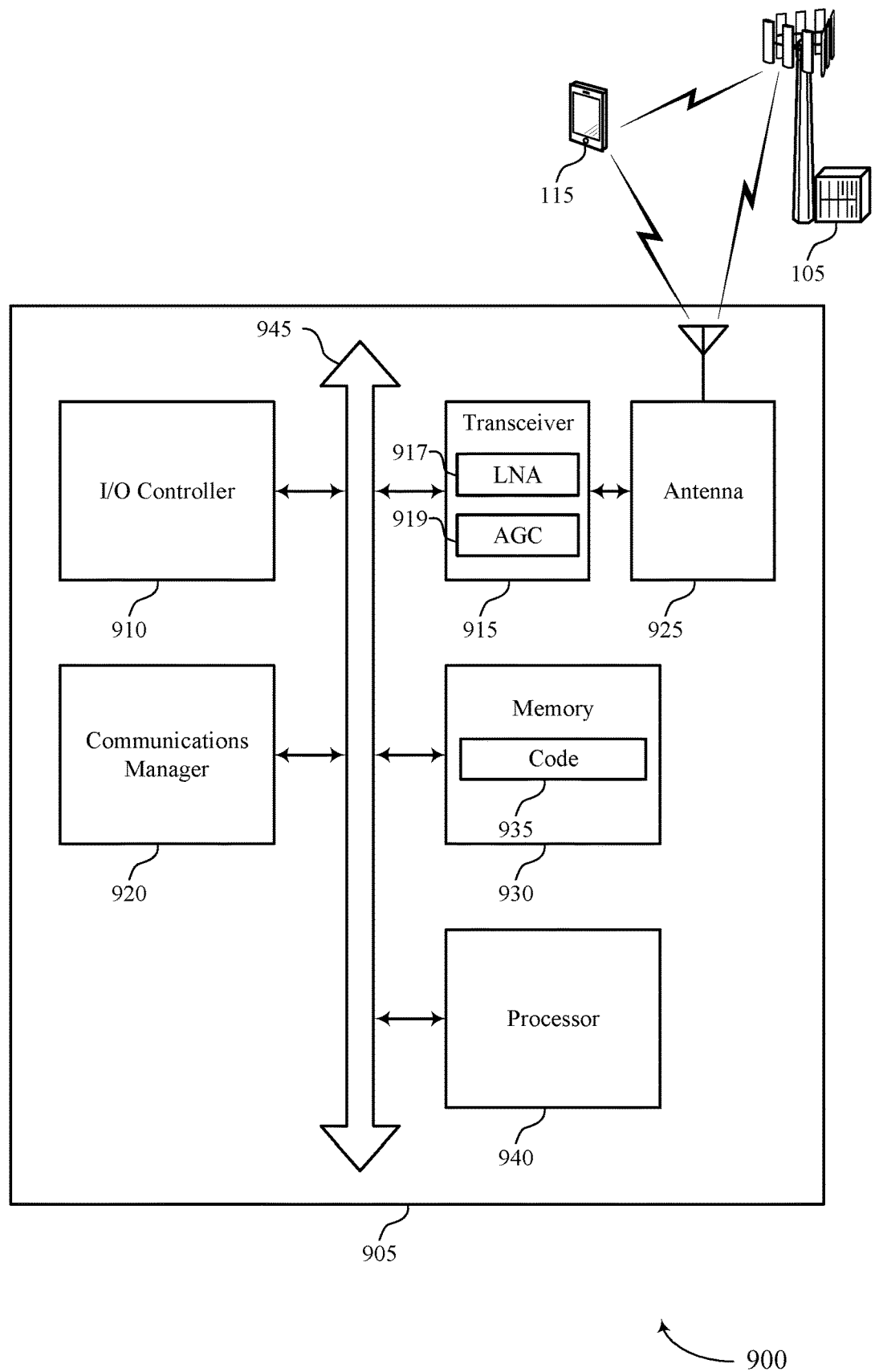
FIG. 9 shows a diagram of a system including a device that supports power adjustment requests for downlink signaling based on received power overloading in accordance with aspects of the present disclosure.

FIG. 9 shows a diagram of a system 900 including a device 905 that supports power adjustment requests for downlink signaling based on received power overloading in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein. The transceiver 915 may include an LNA 917 and an AGC component 919. The overload threshold may be associated with a first saturation level of the LNA 917, a second saturation level of the AGC component 919, or both. For example, the overload threshold may be configured to avoid saturation of the LNA 917, avoid saturation of the AGC component 919, or both.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting power adjustment requests for downlink signaling based on received power overloading). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving, from a first wireless node, first downlink signaling associated with a first received power. The communications manager 920 may be configured as or otherwise support a means for identifying, based on receiving the first downlink signaling, that a total received power at the UE exceeds an overload threshold. The communications manager 920 may be configured as or otherwise support a means for transmitting, to the first wireless node based on the identifying, an explicit indication associated with the total received power at the UE exceeding the overload threshold. The communications manager 920 may be configured as or otherwise support a means for receiving, from the first wireless node and based on transmitting the explicit indication, second downlink signaling associated with a second received power less than the first received power.

By including or configuring the communications manager 920 in accordance with examples as described herein, the device 905 may support techniques for power adjustment requesting based on received power overloading, resulting in decreased system delays, more reliable wireless communications, increased system throughput, decreased system latency, and improved user experience.

In some examples, the communications manager 920 may be configured to perform various operations (e.g., receiving, monitoring, transmitting) using or otherwise in cooperation with the transceiver 915, the one or more antennas 925, or any combination thereof. For example, the communications manager 920 may be configured to receive or transmit messages or other signaling as described herein via the transceiver 915. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of power adjustment requests for downlink signaling based on received power overloading as described herein, or the processor 940 and the memory 930 may be otherwise configured to perform or support such operations.

Figure 10:
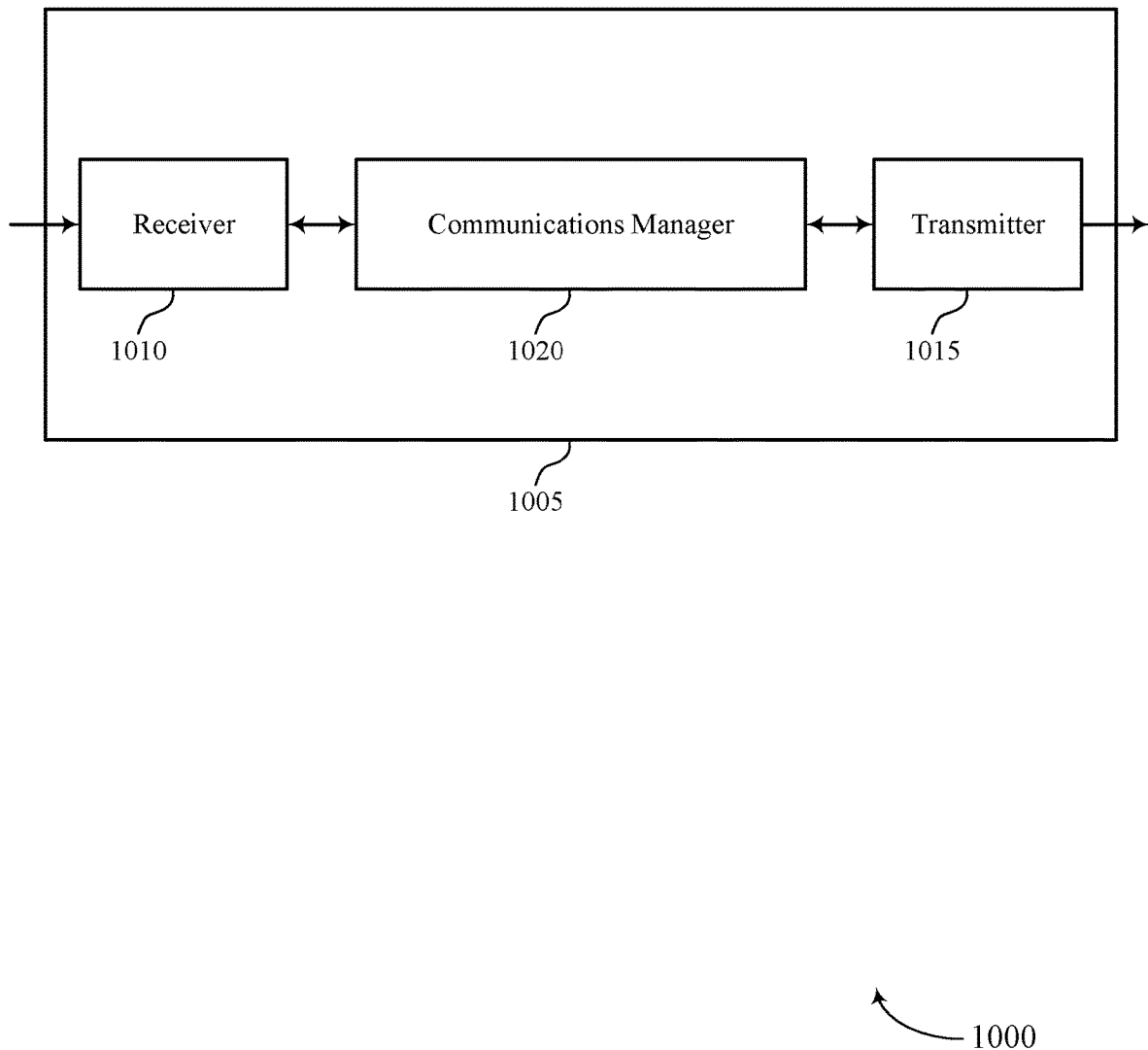
FIGS. 10 and 11 show block diagrams of devices that support power adjustment requests for downlink signaling based on received power overloading in accordance with aspects of the present disclosure.

FIG. 10 shows a block diagram 1000 of a device 1005 that supports power adjustment requests for downlink signaling based on received power overloading in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to power adjustment requests for downlink signaling based on received power overloading).

Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to power adjustment requests for downlink signaling based on received power overloading). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of power adjustment requests for downlink signaling based on received power overloading as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a first wireless node in accordance with examples as disclosed herein. For example, the communications manager 1020 may be configured as or otherwise support a means for transmitting, to a UE, first downlink signaling associated with a first transmit power. The communications manager 1020 may be configured as or otherwise support a means for receiving, from the UE, an explicit indication associated with a total received power at the UE exceeding an overload threshold, where the total received power at the UE is based on the first downlink signaling associated with the first transmit power. The communications manager 1020 may be configured as or otherwise support a means for transmitting, to the UE, second downlink signaling associated with a second transmit power less than the first transmit power, where the second transmit power is based on the explicit indication associated with the total received power at the UE exceeding the overload threshold.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for power adjustment requesting based on received power overloading, resulting in decreased system delays, more reliable wireless communications, more efficient use of wireless and computational resources, increased system throughput, decreased system latency, and improved user experience.

Figure 11:
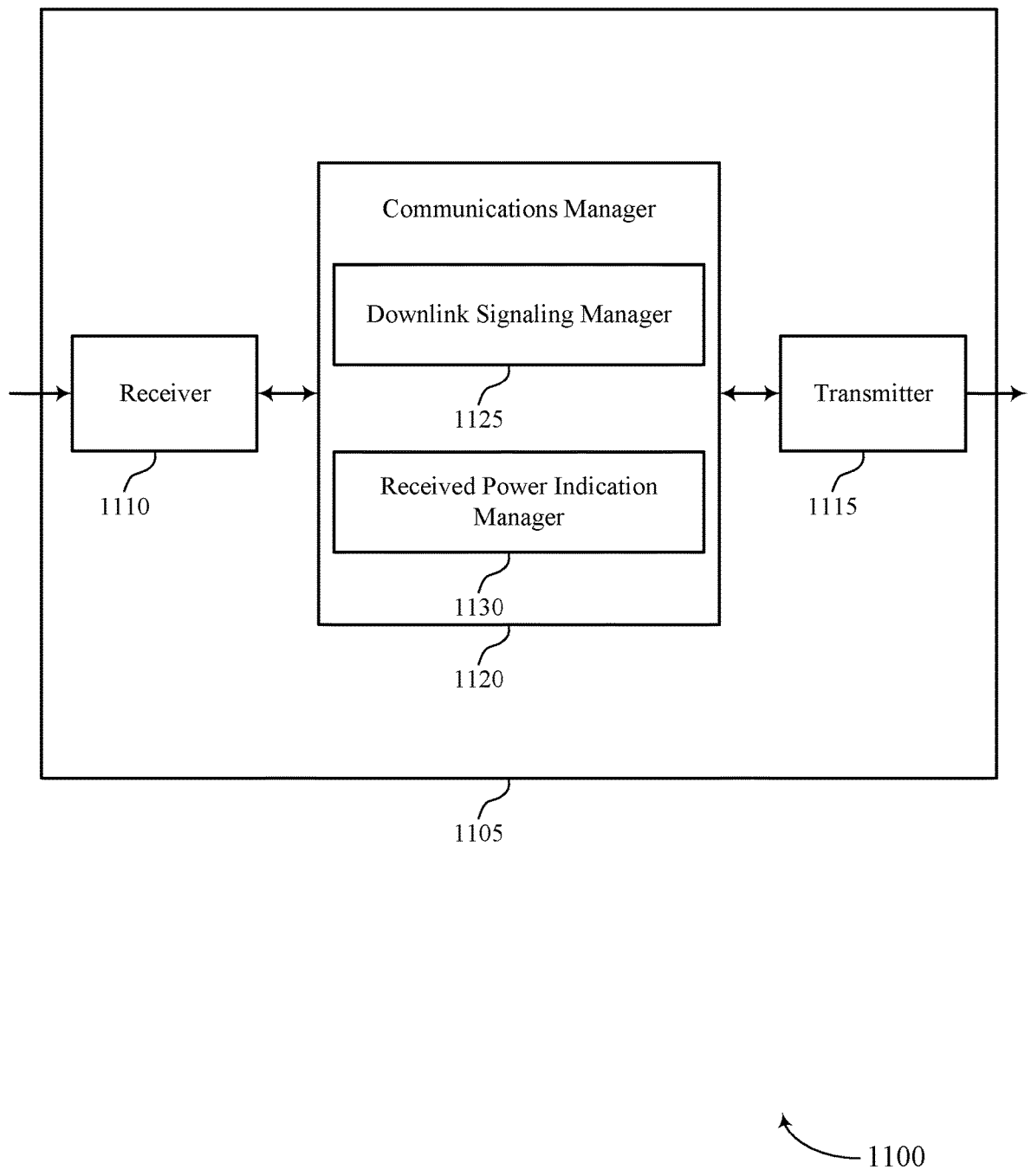

FIG. 11 shows a block diagram 1100 of a device 1105 that supports power adjustment requests for downlink signaling based on received power overloading in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to power adjustment requests for downlink signaling based on received power overloading). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to power adjustment requests for downlink signaling based on received power overloading). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of power adjustment requests for downlink signaling based on received power overloading as described herein. For example, the communications manager 1120 may include a downlink signaling manager 1125 a received power indication manager 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a first wireless node in accordance with examples as disclosed herein. The downlink signaling manager 1125 may be configured as or otherwise support a means for transmitting, to a UE, first downlink signaling associated with a first transmit power. The received power indication manager 1130 may be configured as or otherwise support a means for receiving, from the UE, an explicit indication associated with a total received power at the UE exceeding an overload threshold, where the total received power at the UE is based on the first downlink signaling associated with the first transmit power. The downlink signaling manager 1125 may be configured as or otherwise support a means for transmitting, to the UE, second downlink signaling associated with a second transmit power less than the first transmit power, where the second transmit power is based on the explicit indication associated with the total received power at the UE exceeding the overload threshold.

Figure 12:
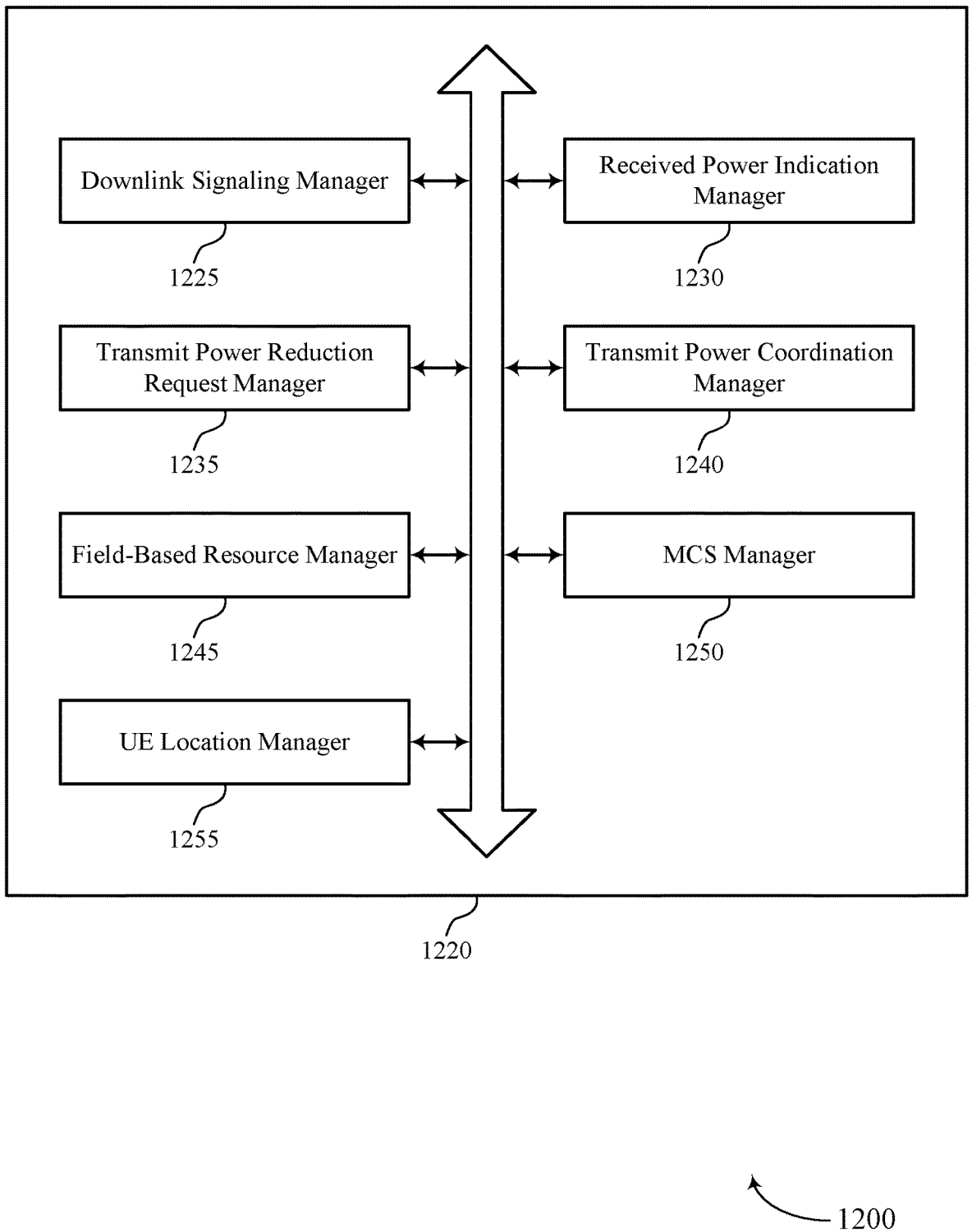
FIG. 12 shows a block diagram of a communications manager that supports power adjustment requests for downlink signaling based on received power overloading in accordance with aspects of the present disclosure.

FIG. 12 shows a block diagram 1200 of a communications manager 1220 that supports power adjustment requests for downlink signaling based on received power overloading in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of power adjustment requests for downlink signaling based on received power overloading as described herein. For example, the communications manager 1220 may include a downlink signaling manager 1225, a received power indication manager 1230, a transmit power reduction request manager 1235, a transmit power coordination manager 1240, a field-based resource manager 1245, an MCS manager 1250, a UE location manager 1255, or any combination thereof. Each of these components may communicate, directly or indirectly, with one another (e.g., via one or more buses).

The communications manager 1220 may support wireless communications at a first wireless node in accordance with examples as disclosed herein. The downlink signaling manager 1225 may be configured as or otherwise support a means for transmitting, to a UE, first downlink signaling associated with a first transmit power. The received power indication manager 1230 may be configured as or otherwise support a means for receiving, from the UE, an explicit indication associated with a total received power at the UE exceeding an overload threshold, where the total received power at the UE is based on the first downlink signaling associated with the first transmit power. In some examples, the downlink signaling manager 1225 may be configured as or otherwise support a means for transmitting, to the UE, second downlink signaling associated with a second transmit power less than the first transmit power, where the second transmit power is based on the explicit indication associated with the total received power at the UE exceeding the overload threshold.

In some examples, to support receiving the explicit indication associated with the total received power at the UE exceeding the overload threshold, the transmit power reduction request manager 1235 may be configured as or otherwise support a means for receiving an explicit request to reduce a transmit power for downlink signaling to the UE by an indicated amount of reduction equal to a difference between the first transmit power and the second transmit power.

In some examples, to support receiving the explicit indication associated with the total received power at the UE exceeding the overload threshold, the transmit power reduction request manager 1235 may be configured as or otherwise support a means for receiving the indication via a first set of frequency resources, where the first downlink signaling is transmitted via the first set of frequency resources.

In some examples, to support receiving the explicit indication associated with the total received power at the UE exceeding the overload threshold, the received power indication manager 1230 may be configured as or otherwise support a means for receiving the indication via a first set of frequency resources, where the first downlink signaling is transmitted via a second set of frequency resources that is different from the first set of frequency resources.

In some examples, the transmit power coordination manager 1240 may be configured as or otherwise support a means for exchanging signaling with a second wireless node based on receiving the explicit indication associated with the total received power at the UE exceeding the overload threshold, where the total received power at the UE is based on downlink signaling by the second wireless node, and where the second transmit power is based on exchanging the signaling with the second wireless node.

In some examples, to support exchanging the signaling with the second wireless node, the transmit power coordination manager 1240 may be configured as or otherwise support a means for transmitting to the second wireless node or receiving from the second wireless node an explicit indication of an amount of transmit power reduction for the first wireless node, an amount of transmit power reduction for the second wireless node, or both.

In some examples, the field-based resource manager 1245 may be configured as or otherwise support a means for transmitting, to the UE based on receiving the explicit indication associated with the total received power at the UE exceeding the overload threshold, an indication of a first subset of resources for the second downlink signaling associated with the second transmit power, where the second downlink signaling is transmitted via the first subset of resources.

In some examples, the field-based resource manager 1245 may be configured as or otherwise support a means for transmitting, to a second UE, an indication of a second subset of resources for third downlink signaling associated with a third transmit power that is greater than the second transmit power, where the third transmit power being associated with the third downlink signaling to the second UE is based on the second UE being farther from the first wireless node than the UE. In some examples, the field-based resource manager 1245 may be configured as or otherwise support a means for transmitting, to the second UE, the third downlink signaling associated with the third transmit power via the second subset of resources.

In some examples, the UE location manager 1255 may be configured as or otherwise support a means for determining that a location of the first UE satisfies a threshold distance from the first wireless node. In some examples, the UE location manager 1255 may be configured as or otherwise support a means for determining that a location of the second UE fails to satisfy the threshold distance from the first wireless node. In some examples, the UE location manager 1255 may be configured as or otherwise support a means for determining that the second UE is farther from the first wireless node than the first UE based on determining that the location of the first UE satisfies the threshold distance from the first wireless node and determining that the location of the second UE fails to satisfy the threshold distance from the first wireless node.

In some examples, to support transmitting the second downlink signaling, the MCS manager 1250 may be configured as or otherwise support a means for transmitting the second downlink signaling according to a second modulation and coding scheme associated with the second transmit power, where the second modulation and coding scheme is different from a first modulation and coding scheme associated with the first downlink signaling.

In some examples, the first wireless node includes a base station, a transmission reception point, or a third UE.

Figure 13:
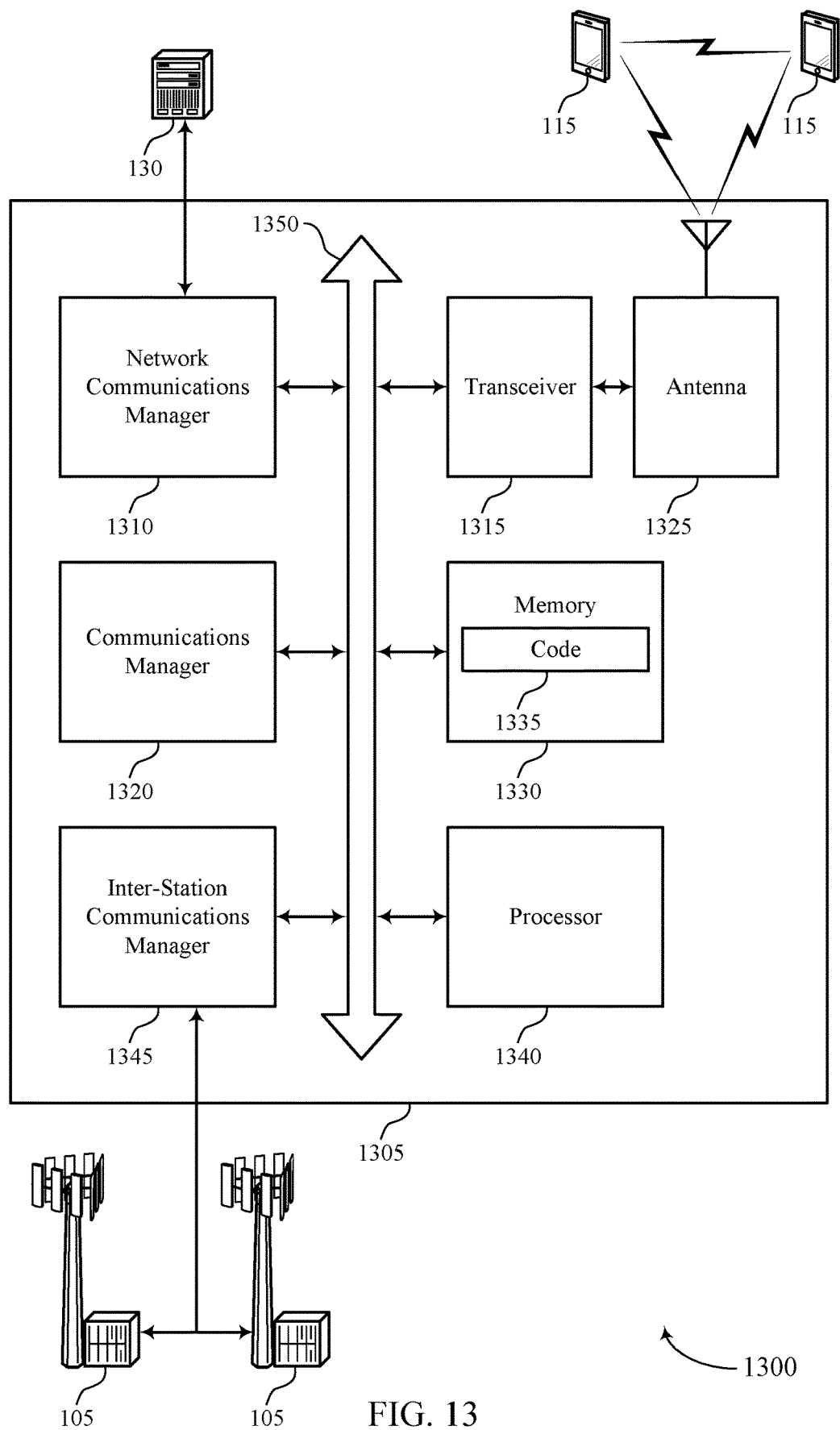
FIG. 13 shows a diagram of a system including a device that supports power adjustment requests for downlink signaling based on received power overloading in accordance with aspects of the present disclosure.

FIG. 13 shows a diagram of a system 1300 including a device 1305 that supports power adjustment requests for downlink signaling based on received power overloading in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting power adjustment requests for downlink signaling based on received power overloading). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a first wireless node in accordance with examples as disclosed herein. For example, the communications manager 1320 may be configured as or otherwise support a means for transmitting, to a UE, first downlink signaling associated with a first transmit power. The communications manager 1320 may be configured as or otherwise support a means for receiving, from the UE, an explicit indication associated with a total received power at the UE exceeding an overload threshold, where the total received power at the UE is based on the first downlink signaling associated with the first transmit power. The communications manager 1320 may be configured as or otherwise support a means for transmitting, to the UE, second downlink signaling associated with a second transmit power less than the first transmit power, where the second transmit power is based on the explicit indication associated with the total received power at the UE exceeding the overload threshold.

By including or configuring the communications manager 1320 in accordance with examples as described herein, the device 1305 may support techniques for power adjustment requesting based on received power overloading, resulting in decreased system delays, more reliable wireless communications, increased system throughput, decreased system latency, and improved user experience.

In some examples, the communications manager 1320 may be configured to perform various operations (e.g., receiving, monitoring, transmitting) using or otherwise in cooperation with the transceiver 1315, the one or more antennas 1325, or any combination thereof. For example, the communications manager 1320 may be configured to receive or transmit messages or other signaling as described herein via the transceiver 1315. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of power adjustment requests for downlink signaling based on received power overloading as described herein, or the processor 1340 and the memory 1330 may be otherwise configured to perform or support such operations.

Figure 14:
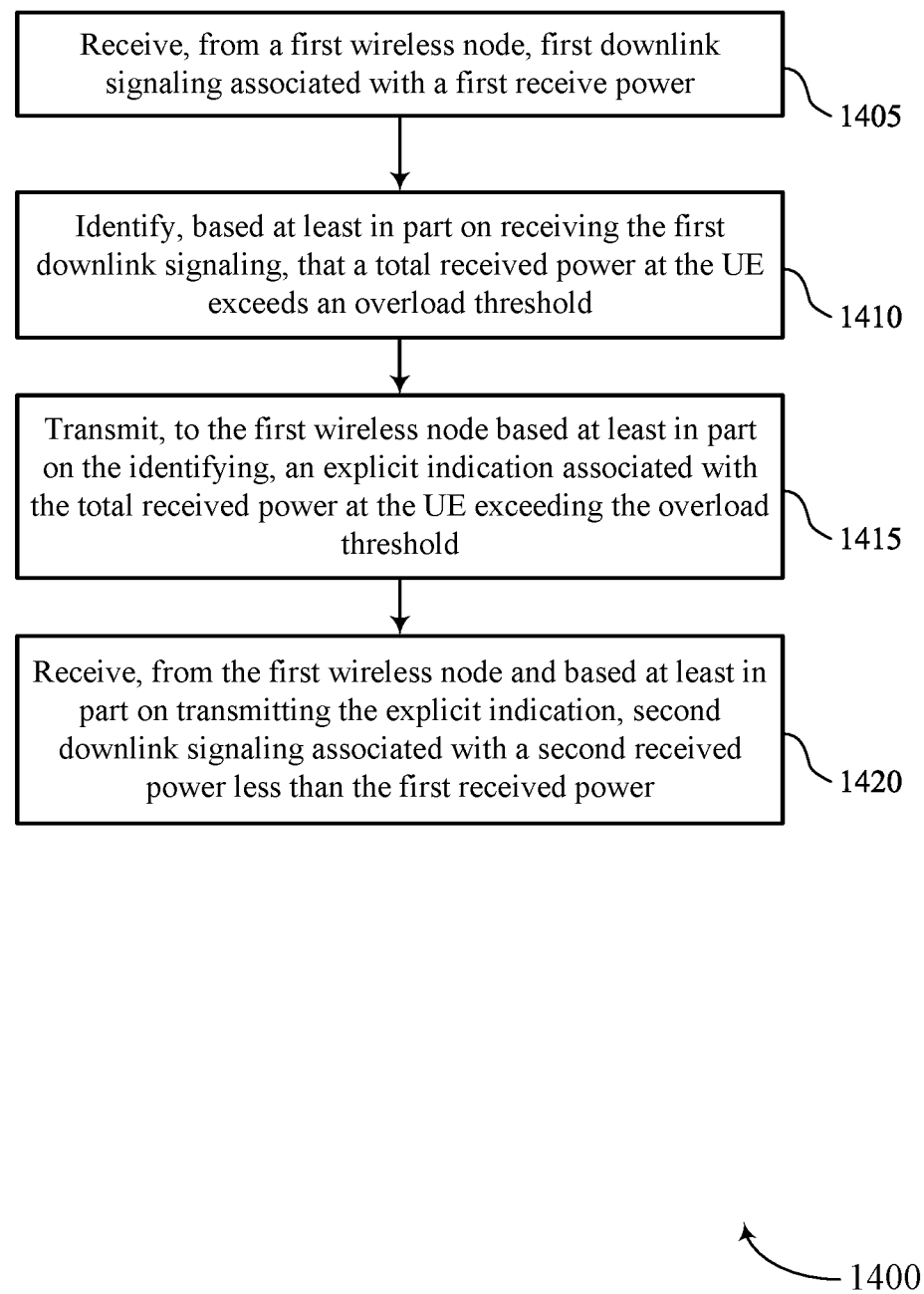
FIGS. 14 through 18 show flowcharts illustrating methods that support power adjustment requests for downlink signaling based on received power overloading in accordance with aspects of the present disclosure.

FIG. 14 shows a flowchart illustrating a method 1400 that supports power adjustment requests for downlink signaling based on received power overloading in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a first wireless node, first downlink signaling associated with a first received power. The operations of 1405 may be performed in accordance with examples as disclosed herein. In some examples, aspects of the operations of 1405 may be performed by a downlink signaling manager 825 as described with reference to FIG. 8. Additionally, or alternatively, means for performing the operations of 1405 may, but not necessarily, include, for example, antenna 925, transceiver 915, communications manager 920, memory 930 (e.g., including code 935), processor 940, and/or bus 945.

At 1410, the method may include identifying, based on receiving the first downlink signaling, that a total received power at the UE exceeds an overload threshold. The operations of 1410 may be performed in accordance with examples as disclosed herein. In some examples, aspects of the operations of 1410 may be performed by an overload threshold manager 830 as described with reference to FIG. 8. Additionally, or alternatively, means for performing the operations of 1410 may, but not necessarily, include, for example, antenna 925, transceiver 915, communications manager 920, memory 930 (e.g., including code 935), processor 940, and/or bus 945.

At 1415, the method may include transmitting, to the first wireless node based on the identifying, an explicit indication associated with the total received power at the UE exceeding the overload threshold. The operations of 1415 may be performed in accordance with examples as disclosed herein. In some examples, aspects of the operations of 1415 may be performed by a received power indication manager 835 as described with reference to FIG. 8. Additionally, or alternatively, means for performing the operations of 1415 may, but not necessarily, include, for example, antenna 925, transceiver 915, communications manager 920, memory 930 (e.g., including code 935), processor 940, and/or bus 945.

At 1420, the method may include receiving, from the first wireless node and based on transmitting the explicit indication, second downlink signaling associated with a second received power less than the first received power. The operations of 1420 may be performed in accordance with examples as disclosed herein. In some examples, aspects of the operations of 1420 may be performed by a downlink signaling manager 825 as described with reference to FIG. 8. Additionally, or alternatively, means for performing the operations of 1420 may, but not necessarily, include, for example, antenna 925, transceiver 915, communications manager 920, memory 930 (e.g., including code 935), processor 940, and/or bus 945.

Figure 15:
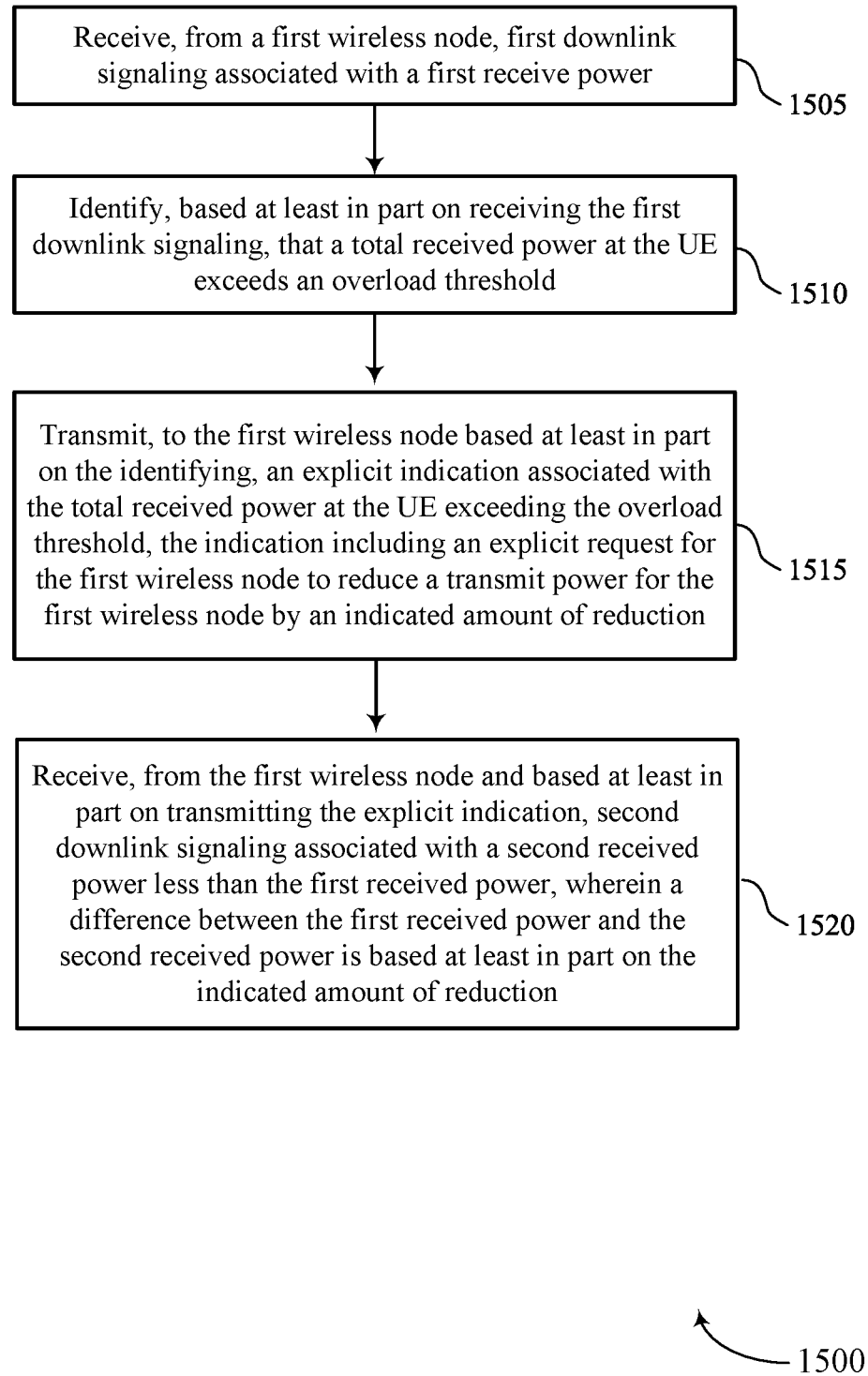

FIG. 15 shows a flowchart illustrating a method 1500 that supports power adjustment requests for downlink signaling based on received power overloading in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving, from a first wireless node, first downlink signaling associated with a first received power. The operations of 1505 may be performed in accordance with examples as disclosed herein. In some examples, aspects of the operations of 1505 may be performed by a downlink signaling manager 825 as described with reference to FIG. 8. Additionally, or alternatively, means for performing the operations of 1505 may, but not necessarily, include, for example, antenna 925, transceiver 915, communications manager 920, memory 930 (e.g., including code 935), processor 940, and/or bus 945.

At 1510, the method may include identifying, based on receiving the first downlink signaling, that a total received power at the UE exceeds an overload threshold. The operations of 1510 may be performed in accordance with examples as disclosed herein. In some examples, aspects of the operations of 1510 may be performed by an overload threshold manager 830 as described with reference to FIG. 8. Additionally, or alternatively, means for performing the operations of 1510 may, but not necessarily, include, for example, antenna 925, transceiver 915, communications manager 920, memory 930 (e.g., including code 935), processor 940, and/or bus 945.

At 1515, the method may include transmitting, to the first wireless node based on the identifying, an explicit indication associated with the total received power at the UE exceeding the overload threshold, the indication including an explicit request for the first wireless node to reduce a transmit power for the first wireless node by an indicated amount of reduction, where a difference between the first received power and the second received power is based on the indicated amount of reduction. The operations of 1515 may be performed in accordance with examples as disclosed herein. In some examples, aspects of the operations of 1515 may be performed by a received power indication manager 835 as described with reference to FIG. 8. Additionally, or alternatively, means for performing the operations of 1515 may, but not necessarily, include, for example, antenna 925, transceiver 915, communications manager 920, memory 930 (e.g., including code 935), processor 940, and/or bus 945.

At 1520, the method may include receiving, from the first wireless node and based on transmitting the indication, second downlink signaling associated with a second received power less than the first received power, wherein a difference between the first received power and the second received power is based at least in part on the indicated amount of reduction. The operations of 1520 may be performed in accordance with examples as disclosed herein. In some examples, aspects of the operations of 1520 may be performed by a downlink signaling manager 825 as described with reference to FIG. 8. Additionally, or alternatively, means for performing the operations of 1520 may, but not necessarily, include, for example, antenna 925, transceiver 915, communications manager 920, memory 930 (e.g., including code 935), processor 940, and/or bus 945.

Figure 16:
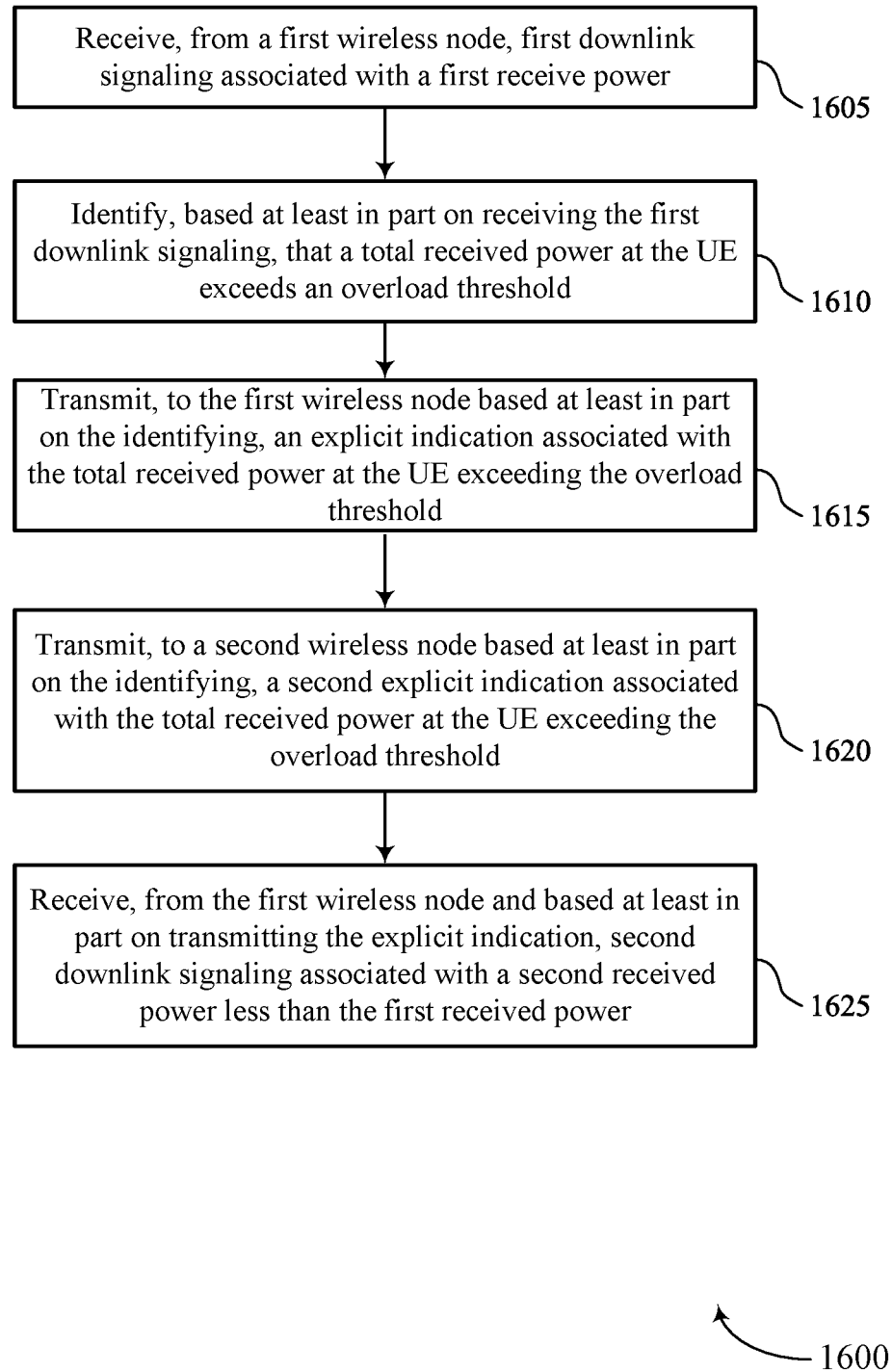

FIG. 16 shows a flowchart illustrating a method 1600 that supports power adjustment requests for downlink signaling based on received power overloading in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving, from a first wireless node, first downlink signaling associated with a first received power. The operations of 1605 may be performed in accordance with examples as disclosed herein. In some examples, aspects of the operations of 1605 may be performed by a downlink signaling manager 825 as described with reference to FIG. 8. Additionally, or alternatively, means for performing the operations of 1605 may, but not necessarily, include, for example, antenna 925, transceiver 915, communications manager 920, memory 930 (e.g., including code 935), processor 940, and/or bus 945.

At 1610, the method may include identifying, based on receiving the first downlink signaling, that a total received power at the UE exceeds an overload threshold. The operations of 1610 may be performed in accordance with examples as disclosed herein. In some examples, aspects of the operations of 1610 may be performed by an overload threshold manager 830 as described with reference to FIG. 8. Additionally, or alternatively, means for performing the operations of 1610 may, but not necessarily, include, for example, antenna 925, transceiver 915, communications manager 920, memory 930 (e.g., including code 935), processor 940, and/or bus 945.

At 1615, the method may include transmitting, to the first wireless node based on the identifying, an explicit indication associated with the total received power at the UE exceeding the overload threshold. The operations of 1615 may be performed in accordance with examples as disclosed herein. In some examples, aspects of the operations of 1615 may be performed by a received power indication manager 835 as described with reference to FIG. 8. Additionally, or alternatively, means for performing the operations of 1615 may, but not necessarily, include, for example, antenna 925, transceiver 915, communications manager 920, memory 930 (e.g., including code 935), processor 940, and/or bus 945.

At 1620, the method may include transmitting, to a second wireless node based on the identifying, a second explicit indication associated with the total received power at the UE exceeding the overload threshold. The operations of 1620 may be performed in accordance with examples as disclosed herein. In some examples, aspects of the operations of 1620 may be performed by a received power indication manager 835 as described with reference to FIG. 8. Additionally, or alternatively, means for performing the operations of 1620 may, but not necessarily, include, for example, antenna 925, transceiver 915, communications manager 920, memory 930 (e.g., including code 935), processor 940, and/or bus 945.

At 1625, the method may include receiving, from the first wireless node and based on transmitting the explicit indication, second downlink signaling associated with a second received power less than the first received power. The operations of 1625 may be performed in accordance with examples as disclosed herein. In some examples, aspects of the operations of 1625 may be performed by a downlink signaling manager 825 as described with reference to FIG. 8. Additionally, or alternatively, means for performing the operations of 1625 may, but not necessarily, include, for example, antenna 925, transceiver 915, communications manager 920, memory 930 (e.g., including code 935), processor 940, and/or bus 945.

Figure 17:
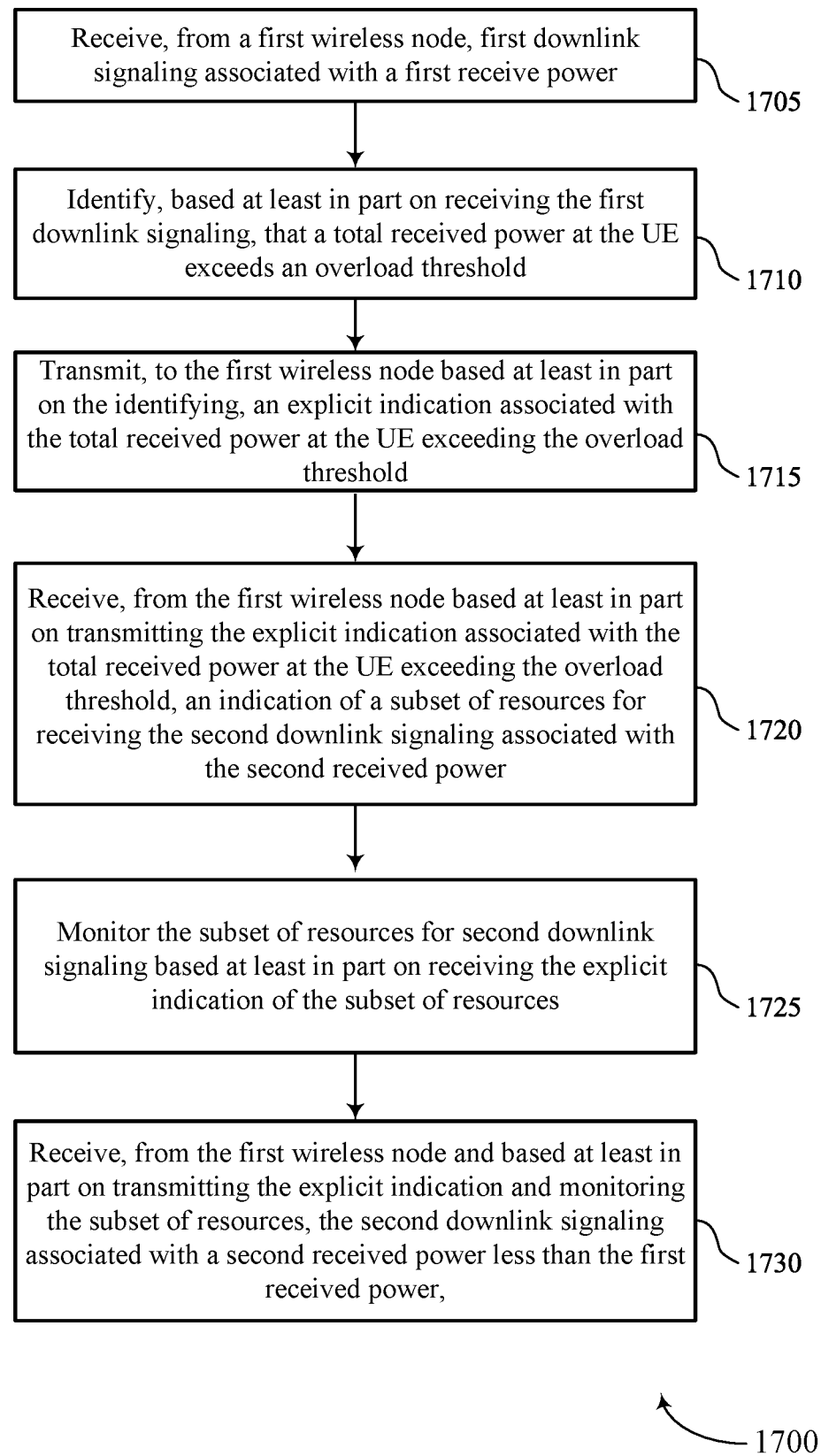

FIG. 17 shows a flowchart illustrating a method 1700 that supports power adjustment requests for downlink signaling based on received power overloading in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include receiving, from a first wireless node, first downlink signaling associated with a first received power. The operations of 1705 may be performed in accordance with examples as disclosed herein. In some examples, aspects of the operations of 1705 may be performed by a downlink signaling manager 825 as described with reference to FIG. 8. Additionally, or alternatively, means for performing the operations of 1705 may, but not necessarily, include, for example, antenna 925, transceiver 915, communications manager 920, memory 930 (e.g., including code 935), processor 940, and/or bus 945.

At 1710, the method may include identifying, based on receiving the first downlink signaling, that a total received power at the UE exceeds an overload threshold. The operations of 1710 may be performed in accordance with examples as disclosed herein. In some examples, aspects of the operations of 1710 may be performed by an overload threshold manager 830 as described with reference to FIG. 8. Additionally, or alternatively, means for performing the operations of 1710 may, but not necessarily, include, for example, antenna 925, transceiver 915, communications manager 920, memory 930 (e.g., including code 935), processor 940, and/or bus 945.

At 1715, the method may include transmitting, to the first wireless node based on the identifying, an explicit indication associated with the total received power at the UE exceeding the overload threshold. The operations of 1715 may be performed in accordance with examples as disclosed herein. In some examples, aspects of the operations of 1715 may be performed by a received power indication manager 835 as described with reference to FIG. 8. Additionally, or alternatively, means for performing the operations of 1715 may, but not necessarily, include, for example, antenna 925, transceiver 915, communications manager 920, memory 930 (e.g., including code 935), processor 940, and/or bus 945.

At 1720, the method may include receiving, from the first wireless node based on transmitting the explicit indication associated with the total received power at the UE exceeding the overload threshold, an indication of a subset of resources for receiving the second downlink signaling associated with the second received power. The operations of 1720 may be performed in accordance with examples as disclosed herein. In some examples, aspects of the operations of 1720 may be performed by a field-based resource manager 845 as described with reference to FIG. 8. Additionally, or alternatively, means for performing the operations of 1720 may, but not necessarily, include, for example, antenna 925, transceiver 915, communications manager 920, memory 930 (e.g., including code 935), processor 940, and/or bus 945.

At 1725, the method may include monitoring the subset of resources for second downlink signaling based on receiving the indication of the subset of resources, where receiving the second downlink signaling associated with the second received power is based on the monitoring. The operations of 1725 may be performed in accordance with examples as disclosed herein. In some examples, aspects of the operations of 1725 may be performed by a field-based resource manager 845 as described with reference to FIG. 8. Additionally, or alternatively, means for performing the operations of 1725 may, but not necessarily, include, for example, antenna 925, transceiver 915, communications manager 920, memory 930 (e.g., including code 935), processor 940, and/or bus 945.

At 1730, the method may include receiving, from the first wireless node and based on transmitting the explicit indication and monitoring the subset of resources, the second downlink signaling associated with a second received power less than the first received power. The operations of 1730 may be performed in accordance with examples as disclosed herein. In some examples, aspects of the operations of 1730 may be performed by a downlink signaling manager 825 as described with reference to FIG. 8. Additionally, or alternatively, means for performing the operations of 1730 may, but not necessarily, include, for example, antenna 925, transceiver 915, communications manager 920, memory 930 (e.g., including code 935), processor 940, and/or bus 945.

Figure 18:
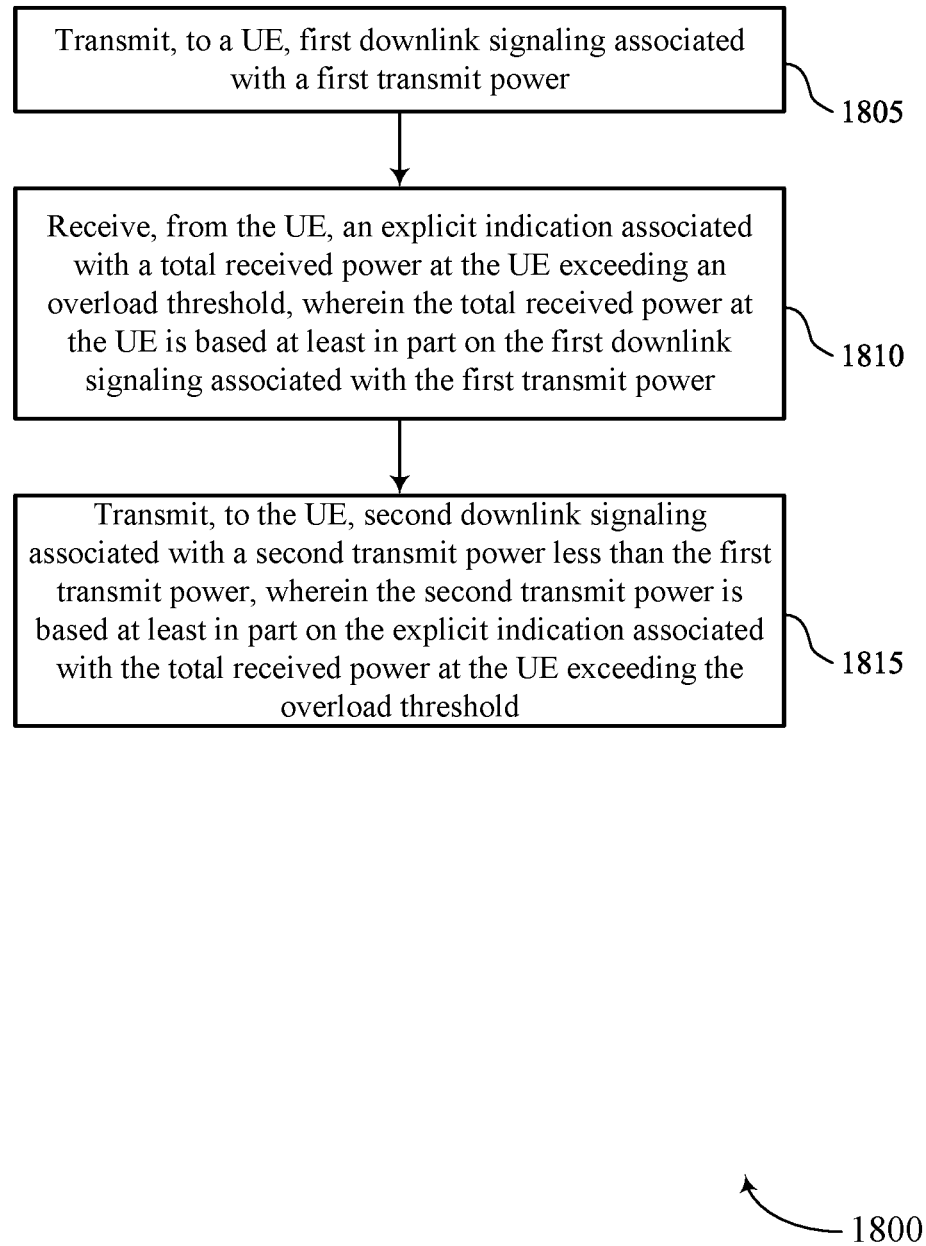

FIG. 18 shows a flowchart illustrating a method 1800 that supports power adjustment requests for downlink signaling based on received power overloading in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally, or alternatively, the base station may perform aspects of the described functions using special-purpose hardware.

At 1805, the method may include transmitting, to a UE, first downlink signaling associated with a first transmit power. The operations of 1805 may be performed in accordance with examples as disclosed herein. In some examples, aspects of the operations of 1805 may be performed by a downlink signaling manager 1225 as described with reference to FIG. 12. Additionally, or alternatively, means for performing the operations of 1805 may, but not necessarily, include, for example, antenna 1325, transceiver 1315, communications manager 1320, memory 1330 (e.g., including code 1335), processor 1340, and/or bus 1350.

At 1810, the method may include receiving, from the UE, an explicit indication associated with a total received power at the UE exceeding an overload threshold, where the total received power at the UE is based on the first downlink signaling associated with the first transmit power. The operations of 1810 may be performed in accordance with examples as disclosed herein. In some examples, aspects of the operations of 1810 may be performed by a received power indication manager 1230 as described with reference to FIG. 12. Additionally, or alternatively, means for performing the operations of 1810 may, but not necessarily, include, for example, antenna 1325, transceiver 1315, communications manager 1320, memory 1330 (e.g., including code 1335), processor 1340, and/or bus 1350.

At 1815, the method may include transmitting, to the UE, second downlink signaling associated with a second transmit power less than the first transmit power, where the second transmit power is based on the explicit indication associated with the total received power at the UE exceeding the overload threshold. The operations of 1815 may be performed in accordance with examples as disclosed herein. In some examples, aspects of the operations of 1815 may be performed by a downlink signaling manager 1225 as described with reference to FIG. 12. Additionally, or alternatively, means for performing the operations of 1815 may, but not necessarily, include, for example, antenna 1325, transceiver 1315, communications manager 1320, memory 1330 (e.g., including code 1335), processor 1340, and/or bus 1350.

The following provides an overview of aspects of the present disclosure:

Aspect 1: A method for wireless communications at a UE, comprising: receiving, from a first wireless node, first downlink signaling associated with a first received power; identifying, based at least in part on receiving the first downlink signaling, that a total received power at the UE exceeds an overload threshold; transmitting, to the first wireless node based at least in part on the identifying, an explicit indication associated with the total received power at the UE exceeding the overload threshold; and receiving, from the first wireless node and based at least in part on transmitting the explicit indication, second downlink signaling associated with a second received power less than the first received power.

Aspect 2: The method of aspect 1, wherein transmitting the explicit indication associated with the total received power at the UE exceeding the overload threshold comprises: transmitting an explicit request for the first wireless node to reduce a transmit power for the first wireless node by an indicated amount of reduction, wherein a difference between the first received power and the second received power is based at least in part on the indicated amount of reduction.

Aspect 3: The method of aspect 2, further comprising: determining the indicated amount of reduction based at least in part on the total received power, the overload threshold, an amount of noise for an amplifier of the UE, a sensitivity of an antenna at the UE, or any combination thereof.

Aspect 4: The method of any of aspects 1 through 3, wherein: receiving the first downlink signaling comprises receiving the first downlink signaling on a first set of frequency resources; and transmitting the explicit indication associated with the total received power at the UE exceeding the overload threshold comprises transmitting the explicit indication via the first set of frequency resources.

Aspect 5: The method of any of aspects 1 through 4, wherein: receiving the first downlink signaling comprises receiving the first downlink signaling on a first set of frequency resources; and transmitting the explicit indication associated with the total received power at the UE exceeding the overload threshold comprises transmitting the explicit indication via a second set of frequency resources that is different than the first set of frequency resources.

Aspect 6: The method of any of aspects 1 through 5, further comprising: transmitting, to a second wireless node based at least in part on the identifying, a second explicit indication associated with the total received power at the UE exceeding the overload threshold.

Aspect 7: The method of aspect 6, wherein transmitting the explicit indication and the second explicit indication comprises: transmitting, to the first wireless node, a first request that the first wireless node reduce a first transmit power for the first wireless node by a first indicated amount of reduction; and transmitting, to the second wireless node, a second request that the second wireless node reduce a second transmit power for the second wireless node by a second indicated amount of reduction.

Aspect 8: The method of aspect 7, further comprising: determining the first indicated amount of reduction based at least in part on a distance between the UE and the first wireless node, a received signal strength from the first wireless node, or both, wherein transmitting the first request is based at least in part on the determining the first indicated amount of reduction; and determining the second indicated amount of reduction based at least in part on a distance between the UE and the second wireless node, a received signal strength from the second wireless node, or both, wherein transmitting the second request is based at least in part on the determining the second indicated amount of reduction.

Aspect 9: The method of any of aspects 1 through 8, further comprising: receiving, from the first wireless node based at least in part on transmitting the explicit indication associated with the total received power at the UE exceeding the overload threshold, an indication of a subset of resources for receiving the second downlink signaling associated with the second received power; monitoring the subset of resources for the second downlink signaling based at least in part on receiving the indication of the subset of resources, wherein receiving the second downlink signaling associated with the second received power is based at least in part on the monitoring.

Aspect 10: The method of any of aspects 1 through 9, wherein receiving the second downlink signaling comprises: receiving the second downlink signaling according to a second modulation and coding scheme associated with the second received power, wherein the second modulation and coding scheme is different from a first modulation and coding scheme associated with the first downlink signaling.

Aspect 11: The method of any of aspects 1 through 10, wherein the first wireless node comprises a base station, a transmission reception point, or a second UE.

Aspect 12: The method of any of aspects 1 through 10, wherein the overload threshold is configured to prevent saturation of an AGC component of a transceiver of the UE, or an LNA of the transceiver of the UE, or both.

Aspect 13: The method of any of aspects 1 through 10, wherein identifying that the total received power at the UE exceeds the overload threshold comprises identifying that the UE has entered a near field of the first wireless node.

Aspect 14: A method for wireless communications at a first wireless node, comprising: transmitting, to a UE, first downlink signaling associated with a first transmit power; receiving, from the UE, an explicit indication associated with a total received power at the UE exceeding an overload threshold, wherein the total received power at the UE is based at least in part on the first downlink signaling associated with the first transmit power; and transmitting, to the UE, second downlink signaling associated with a second transmit power less than the first transmit power, wherein the second transmit power is based at least in part on the explicit indication associated with the total received power at the UE exceeding the overload threshold.

Aspect 15: The method of aspect 14, wherein receiving the explicit indication associated with the total received power at the UE exceeding the overload threshold comprises: receiving an explicit request to reduce a transmit power for downlink signaling to the UE by an indicated amount of reduction equal to a difference between the first transmit power and the second transmit power.

Aspect 16: The method of any of aspects 14 through 15, wherein receiving the explicit indication associated with the total received power at the UE exceeding the overload threshold comprises: receiving the indication via a first set of frequency resources, wherein the first downlink signaling is transmitted via the first set of frequency resources.

Aspect 17: The method of any of aspects 14 through 16, wherein receiving the explicit indication associated with the total received power at the UE exceeding the overload threshold comprises: receiving the indication via a first set of frequency resources, wherein the first downlink signaling is transmitted via a second set of frequency resources that is different from the first set of frequency resources.

Aspect 18: The method of any of aspects 14 through 17, further comprising: exchanging signaling with a second wireless node based at least in part on receiving the explicit indication associated with the total received power at the UE exceeding the overload threshold, wherein the total received power at the UE is based at least in part on downlink signaling by the second wireless node, and wherein the second transmit power is based at least in part on exchanging the signaling with the second wireless node.

Aspect 19: The method of aspect 18, wherein exchanging the signaling with the second wireless node comprises: transmitting to the second wireless node or receiving from the second wireless node an explicit indication of an amount of transmit power reduction for the first wireless node, an amount of transmit power reduction for the second wireless node, or both.

Aspect 20: The method of any of aspects 14 through 19, further comprising: transmitting, to the UE based at least in part on receiving the explicit indication associated with the total received power at the UE exceeding the overload threshold, an indication of a first subset of resources for the second downlink signaling associated with the second transmit power, wherein the second downlink signaling is transmitted via the first subset of resources.

Aspect 21: The method of aspect 20, further comprising: transmitting, to a second UE, an indication of a second subset of resources for third downlink signaling associated with a third transmit power that is greater than the second transmit power, wherein the third transmit power being associated with the third downlink signaling to the second UE is based at least in part on the second UE being farther from the first wireless node than the UE; and transmitting, to the second UE, the third downlink signaling associated with the third transmit power via the second subset of resources.

Aspect 22: The method of aspect 21, further comprising: determining that a location of the UE satisfies a threshold distance from the first wireless node; determining that a location of the second UE fails to satisfy the threshold distance from the first wireless node; determining that the second UE is farther from the first wireless node than the UE based at least in part on determining that the location of the UE satisfies the threshold distance from the first wireless node and determining that the location of the second UE fails to satisfy the threshold distance from the first wireless node.

Aspect 23: The method of any of aspects 14 through 22, wherein transmitting the second downlink signaling comprises: transmitting the second downlink signaling according to a second modulation and coding scheme associated with the second transmit power, wherein the second modulation and coding scheme is different from a first modulation and coding scheme associated with the first downlink signaling.

Aspect 24: The method of any of aspects 14 through 23, wherein the first wireless node comprises a base station, a transmission reception point, or a third UE.

Aspect 25: An apparatus comprising memory, a transceiver, and at least one processor coupled with the memory and the transceiver, the at least one processor configured to cause the apparatus to perform a method of any of aspects 1 through 11.

Aspect 26: An apparatus for wireless communications at a UE, comprising at least one means for performing a method of any of aspects 1 through 11.

Aspect 27: A non-transitory computer-readable medium storing code for wireless communications at a UE, the code comprising instructions executable by a processor to perform a method of any of aspects 1 through 11.

Aspect 28: An apparatus comprising memory, a transceiver, and at least one processor coupled with the memory and the transceiver, the at least one processor configured to cause the apparatus to perform a method of any of aspects 14 through 24.

Aspect 29: An apparatus for wireless communications at a first wireless node, comprising at least one means for performing a method of any of aspects 14 through 24.

Aspect 30: A non-transitory computer-readable medium storing code for wireless communications at a first wireless node, the code comprising instructions executable by a processor to perform a method of any of aspects 14 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving, from a first wireless node, first downlink signaling associated with a first received power;
    identifying, based at least in part on receiving the first downlink signaling, that a total received power at the UE exceeds an overload threshold;
    transmitting, to the first wireless node based at least in part on the identifying, an explicit indication associated with the total received power at the UE exceeding the overload threshold; and
    receiving, from the first wireless node and based at least in part on transmitting the explicit indication, second downlink signaling associated with a second received power less than the first received power.

2. The method of claim 1, wherein transmitting the explicit indication associated with the total received power at the UE exceeding the overload threshold comprises:
    transmitting an explicit request for the first wireless node to reduce a transmit power for the first wireless node by an indicated amount of reduction, wherein a difference between the first received power and the second received power is based at least in part on the indicated amount of reduction.

3. The method of claim 2, further comprising:
determining the indicated amount of reduction based at least in part on the total received power, the overload threshold, an amount of noise for an amplifier of the UE, a sensitivity of an antenna at the UE, or any combination thereof.

4. The method of claim 1, wherein:
receiving the first downlink signaling comprises receiving the first downlink signaling on a first set of frequency resources; and
transmitting the explicit indication associated with the total received power at the UE exceeding the overload threshold comprises transmitting the explicit indication via the first set of frequency resources.

5. The method of claim 1, wherein:
receiving the first downlink signaling comprises receiving the first downlink signaling on a first set of frequency resources; and
transmitting the explicit indication associated with the total received power at the UE exceeding the overload threshold comprises transmitting the explicit indication via a second set of frequency resources that is different from the first set of frequency resources.

6. The method of claim 1, further comprising:
transmitting, to a second wireless node based at least in part on the identifying, a second explicit indication associated with the total received power at the UE exceeding the overload threshold, wherein transmitting the explicit indication and the second explicit indication comprises:
    transmitting, to the first wireless node, a first request that the first wireless node reduce a first transmit power for the first wireless node by a first indicated amount of reduction; and
    transmitting, to the second wireless node, a second request that the second wireless node reduce a second transmit power for the second wireless node by a second indicated amount of reduction.

7. The method of claim 6, further comprising:
determining the first indicated amount of reduction based at least in part on a distance between the UE and the first wireless node, a received signal strength from the first wireless node, or both, wherein transmitting the first request is based at least in part on the determining the first indicated amount of reduction; and
determining the second indicated amount of reduction based at least in part on a distance between the UE and the second wireless node, a received signal strength from the second wireless node, or both, wherein transmitting the second request is based at least in part on the determining the second indicated amount of reduction.

8. The method of claim 1, further comprising:
receiving, from the first wireless node based at least in part on transmitting the explicit indication associated with the total received power at the UE exceeding the overload threshold, an indication of a subset of resources for receiving the second downlink signaling associated with the second received power; and
monitoring the subset of resources for the second downlink signaling based at least in part on receiving the indication of the subset of resources, wherein receiving the second downlink signaling associated with the second received power is based at least in part on the monitoring.

9. The method of claim 1, wherein receiving the second downlink signaling comprises:
receiving the second downlink signaling according to a second modulation and coding scheme associated with the second received power, wherein the second modulation and coding scheme is different from a first modulation and coding scheme associated with the first downlink signaling.

10. The method of claim 1, wherein the first wireless node comprises a base station, a transmission reception point, or a second UE.

11. The method of claim 1, wherein the overload threshold is configured to prevent saturation of an automatic gain control component of a transceiver of the UE, or a low noise amplifier of the transceiver of the UE, or both.

12. The method of claim 1, wherein identifying that the total received power at the UE exceeds the overload threshold comprises:
identifying that the UE has entered a near field for the first wireless node.

13. A method for wireless communications at a first wireless node, comprising:
transmitting, to a user equipment (UE), first downlink signaling associated with a first transmit power;
receiving, from the UE, an explicit indication associated with a total received power at the UE exceeding an overload threshold, wherein the total received power at the UE is based at least in part on the first downlink signaling associated with the first transmit power; and
transmitting, to the UE, second downlink signaling associated with a second transmit power less than the first transmit power, wherein the second transmit power is based at least in part on the explicit indication associated with the total received power at the UE exceeding the overload threshold.

14. The method of claim 13, wherein receiving the explicit indication associated with the total received power at the UE exceeding the overload threshold comprises:
receiving an explicit request to reduce a transmit power for downlink signaling to the UE by an indicated amount of reduction equal to a difference between the first transmit power and the second transmit power.

15. The method of claim 13, further comprising:
exchanging signaling with a second wireless node based at least in part on receiving the explicit indication associated with the total received power at the UE exceeding the overload threshold, wherein the total received power at the UE is based at least in part on downlink signaling by the second wireless node, and wherein the second transmit power is based at least in part on exchanging the signaling with the second wireless node.

16. The method of claim 15, wherein exchanging the signaling with the second wireless node comprises:
transmitting to the second wireless node or receiving from the second wireless node an explicit indication of an amount of transmit power reduction for the first wireless node, an amount of transmit power reduction for the second wireless node, or both.

17. The method of claim 13, further comprising:
transmitting, to the UE based at least in part on receiving the explicit indication associated with the total received power at the UE exceeding the overload threshold, an indication of a first subset of resources for the second downlink signaling associated with the second transmit power, wherein the second downlink signaling is transmitted via the first subset of resources.

18. The method of claim 17, further comprising:
transmitting, to a second UE, an indication of a second subset of resources for third downlink signaling associated with a third transmit power that is greater than the second transmit power, wherein the third transmit power being associated with the third downlink signaling to the second UE is based at least in part on the second UE being farther from the first wireless node than the UE; and
transmitting, to the second UE, the third downlink signaling associated with the third transmit power via the second subset of resources.

19. The method of claim 18, further comprising:
determining that a location of the UE satisfies a threshold distance from the first wireless node;
determining that a location of the second UE fails to satisfy the threshold distance from the first wireless node; and
determining that the second UE is farther from the first wireless node than the UE based at least in part on determining that the location of the UE satisfies the threshold distance from the first wireless node and determining that the location of the second UE fails to satisfy the threshold distance from the first wireless node.

20. The method of claim 13, wherein transmitting the second downlink signaling comprises:
transmitting the second downlink signaling according to a second modulation and coding scheme associated with the second transmit power, wherein the second modulation and coding scheme is different from a first modulation and coding scheme associated with the first downlink signaling.

21. The method of claim 13, wherein the first wireless node comprises a base station, a transmission reception point, or a third UE.

22. An apparatus for wireless communications, comprising:
memory;
a transceiver; and
at least one processor of a user equipment (UE), the at least one processor coupled with the memory and the transceiver, and the at least one processor configured to cause the apparatus to:
receive, from a first wireless node via the transceiver, first downlink signaling associated with a first received power;
identify, based at least in part on receiving the first downlink signaling, that a total received power at the UE exceeding an overload threshold;
transmit, to the first wireless node via the transceiver based at least in part on the identifying, an explicit indication associated with the total received power at the UE exceeding the overload threshold; and
receive, from the first wireless node via the transceiver and based at least in part on transmitting the explicit indication, second downlink signaling associated with a second received power less than the first received power.

23. The apparatus of claim 22, wherein, to transmit the explicit indication associated with the total received power at the UE exceeding the overload threshold, the at least one processor is configured to cause the apparatus to:

transmit an explicit request for the first wireless node to reduce a transmit power for the first wireless node by an indicated amount of reduction, wherein a difference between the first received power and the second received power is based at least in part on the indicated amount of reduction.

24. The apparatus of claim 22, the at least one processor further configured to cause the apparatus to:
transmit, to a second wireless node based at least in part on the identifying, a second explicit indication associated with the total received power at the UE exceeding the overload threshold, wherein, to transmit the explicit indication and the second explicit indication, the at least one processor is configured to cause the apparatus to:
transmit, to the first wireless node, a first request that the first wireless node reduce a first transmit power for the first wireless node by a first indicated amount of reduction; and
transmit, to the second wireless node, a second request that the second wireless node reduce a second transmit power for the second wireless node by a second indicated amount of reduction.

25. The apparatus of claim 22, the at least one processor further configured to cause the apparatus to:
receive, from the first wireless node based at least in part on transmitting the explicit indication associated with the total received power at the UE exceeding the overload threshold, an indication of a subset of resources for receiving the second downlink signaling associated with the second received power; and
monitor the subset of resources for the second downlink signaling based at least in part on receiving the indication of the subset of resources, wherein receiving the second downlink signaling associated with the second received power is based at least in part on the monitoring.

26. The apparatus of claim 22, wherein:
the transceiver comprises a low noise amplifier, an automatic gain control component, or both; and
the overload threshold is associated with a saturation level of the low noise amplifier, the automatic gain control component, or both.

27. The apparatus of claim 26, wherein the overload threshold is configured to maintain the low noise amplifier, the automatic gain control component, or both, in a linear range of operation.

28. An apparatus for wireless communications, comprising:
memory;
a transceiver; and
at least one processor of a first wireless node, the at least one processor coupled with the memory and the transceiver, and the at least one processor configured to cause the apparatus to:
transmit, to a user equipment (UE) via the transceiver, first downlink signaling associated with a first transmit power;
receive, from the UE via the transceiver, an explicit indication associated with a total received power at the UE exceeding an overload threshold, wherein the total received power at the UE is based at least in part on the first downlink signaling associated with the first transmit power; and
transmit, to the UE via the transceiver, second downlink signaling associated with a second transmit power less than the first transmit power, wherein the second transmit power is based at least in part on the explicit indication associated with the total received power at the UE exceeding the overload threshold.

29. The apparatus of claim 28, wherein, to receive the explicit indication associated with the total received power at the UE exceeding the overload threshold, the at least one processor is configured to cause the apparatus to:
receive an explicit request to reduce a transmit power for downlink signaling to the UE by an indicated amount of reduction equal to a difference between the first transmit power and the second transmit power.

30. The apparatus of claim 28, the at least one processor further configured to cause the apparatus to:
exchange signaling with a second wireless node based at least in part on receiving the explicit indication associated with the total received power at the UE exceeding the overload threshold, wherein the total received power at the UE is based at least in part on downlink signaling by the second wireless node, and wherein the second transmit power is based at least in part on exchanging the signaling with the second wireless node.

* * * * *